United States Patent [19]
Silverman

[11] Patent Number: 5,976,081
[45] Date of Patent: Nov. 2, 1999

[54] METHOD FOR DETECTING SUICIDAL PREDISPOSITION

[76] Inventor: Stephen E. Silverman, 16 N. Calvin Rd., Weston, Conn. 06883

[21] Appl. No.: 08/480,583

[22] Filed: Jun. 7, 1995

Related U.S. Application Data

[63] Continuation-in-part of application No. 07/889,706, May 27, 1992, which is a continuation of application No. 07/599, 815, Oct. 18, 1990, Pat. No. 5,148,483, which is a continuation of application No. 07/053,949, May 26, 1987, abandoned, which is a continuation of application No. 06/522, 398, Aug. 11, 1983, Pat. No. 4,675,904.

[51] Int. Cl.$^6$ ...................................................... A61B 5/00
[52] U.S. Cl. ........................... 600/300; 704/270; 704/276
[58] Field of Search ................................ 128/630, 653.1, 128/901, 898, 773; 381/FOR 110, FOR 117–119; 395/2.12, 2.14, 2.15, 2.79, 2.83, 2.85; 600/300, 407, 586; 704/203, 205, 206, 270, 274, 276

[56] References Cited

U.S. PATENT DOCUMENTS

| | | | |
|---|---|---|---|
| 3,855,416 | 12/1974 | Fuller | 395/2.82 |
| 3,855,417 | 12/1974 | Fuller | 395/2.82 |
| 3,855,418 | 12/1974 | Fuller | 395/2.82 |
| 3,971,034 | 7/1976 | Bell, Jr. et al. | 346/33 R |
| 4,093,821 | 6/1978 | Williamson | 395/2.16 |
| 4,142,067 | 2/1979 | Williamson | 395/2.67 |
| 4,675,904 | 6/1987 | Silverman | 395/2.12 |
| 5,148,483 | 9/1992 | Silverman | 395/2.83 |

OTHER PUBLICATIONS

*Speech Analysis Synthesis and Perception* by J.L. Flanagan, copyright 1965 and published by Academic Press, Inc. of New York. (Pages attached: cover page, table of contents, pp. 51–54, pp. 141–145).
*Speech Processing,* edited by Chris Rowden, copyright 1992 and published by McGraw–Hill Book Company, London. (Pages attached: cover page, table of contents, pp. 10–21).
Antialiasing Filters Reduce Errors in A/D Converters—Design Feature by Robert W. Steer Jr, Frequency Devices, Inc. —*Electronic Design News* —Mar. 30, 1989.
New Collegiate Dictionary, 1976, pp. 39–40; 740.

*Primary Examiner*—Ruth S. Smith
*Attorney, Agent, or Firm*—Charles N. Quinn

[57] ABSTRACT

A method for detecting suicidal predisposition in a person by securing an utterance from the person, identifying the person as being suicidally predisposed if the utterance decays substantially non-instantaneously upon conclusion and identifying the person as being suicidally predisposed if signal amplitude modulation during the utterance is low and identifying the person as being suicidally predisposed if variation in fundamental frequency during the utterance is low and identifying the person as being suicidally predisposed if frequency of amplitude modulation during the utterance is low.

12 Claims, 38 Drawing Sheets

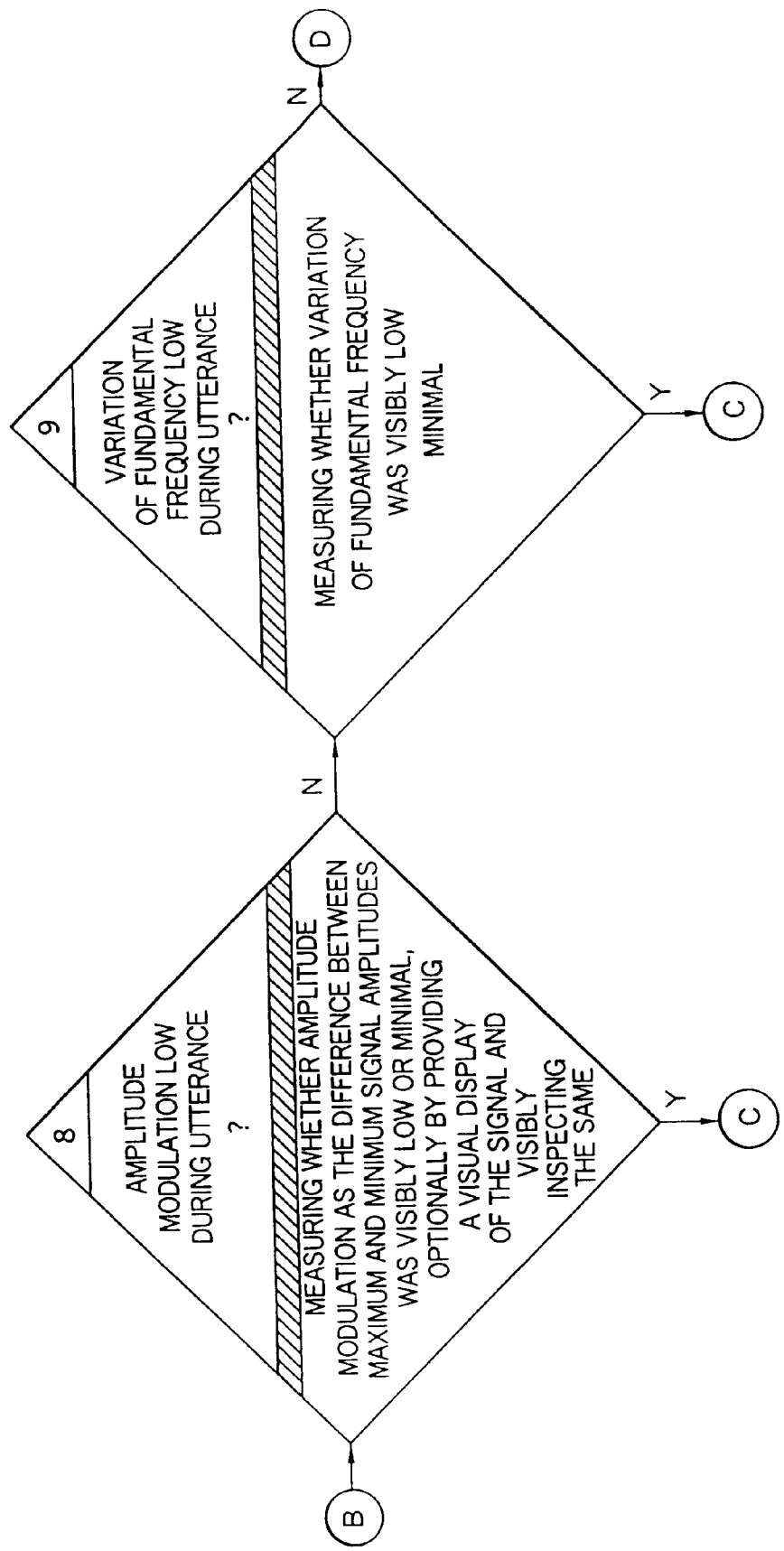

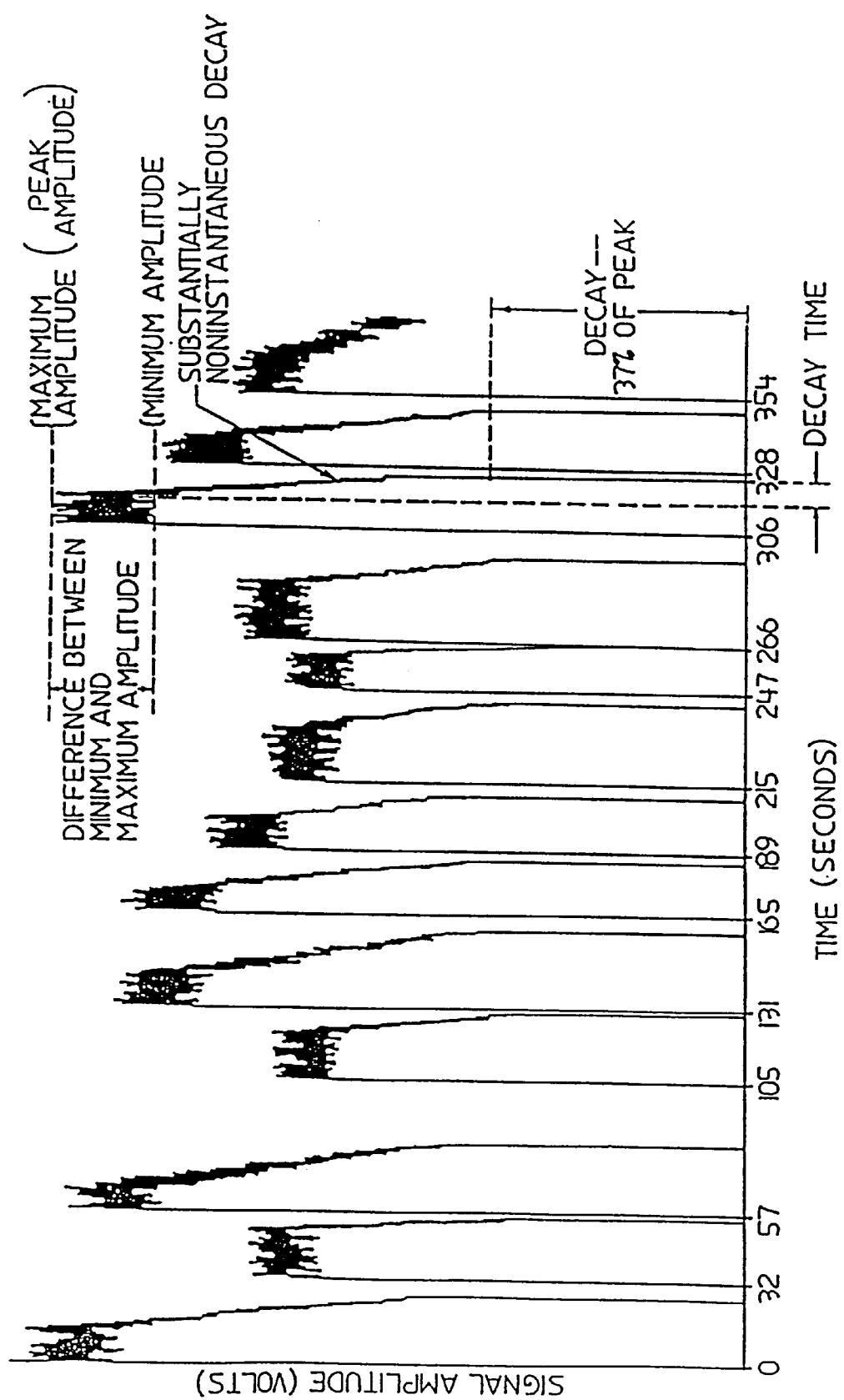

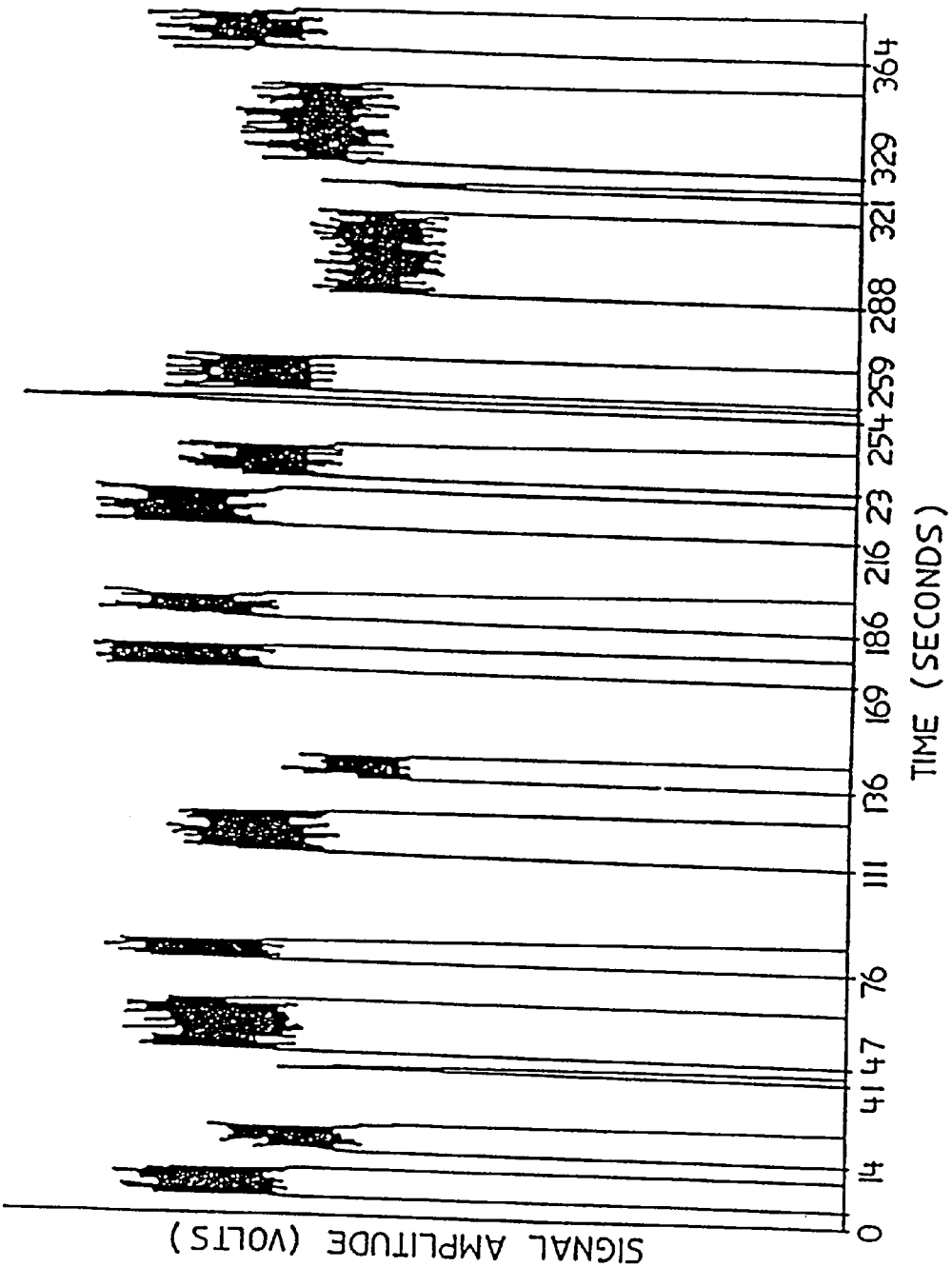

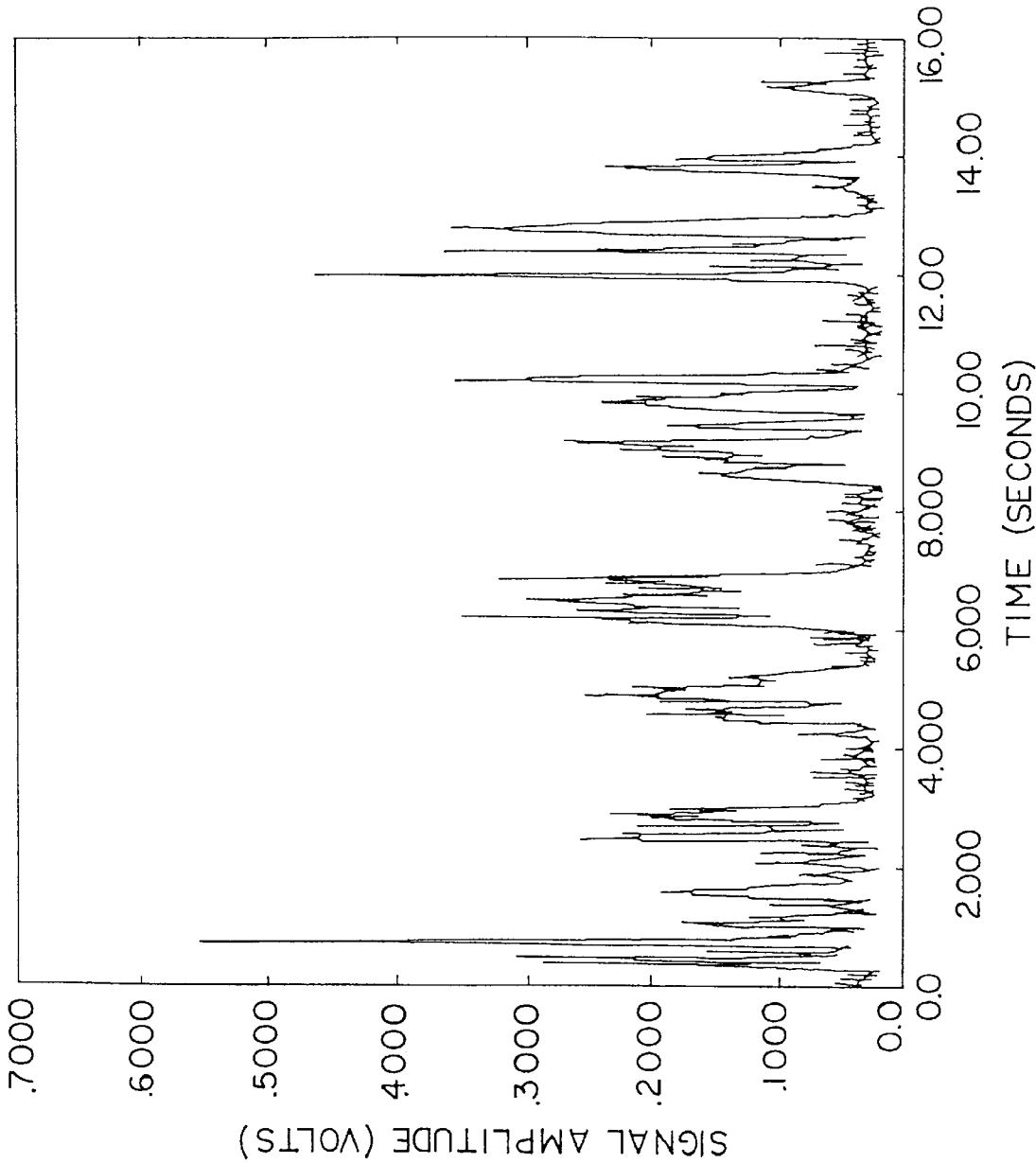

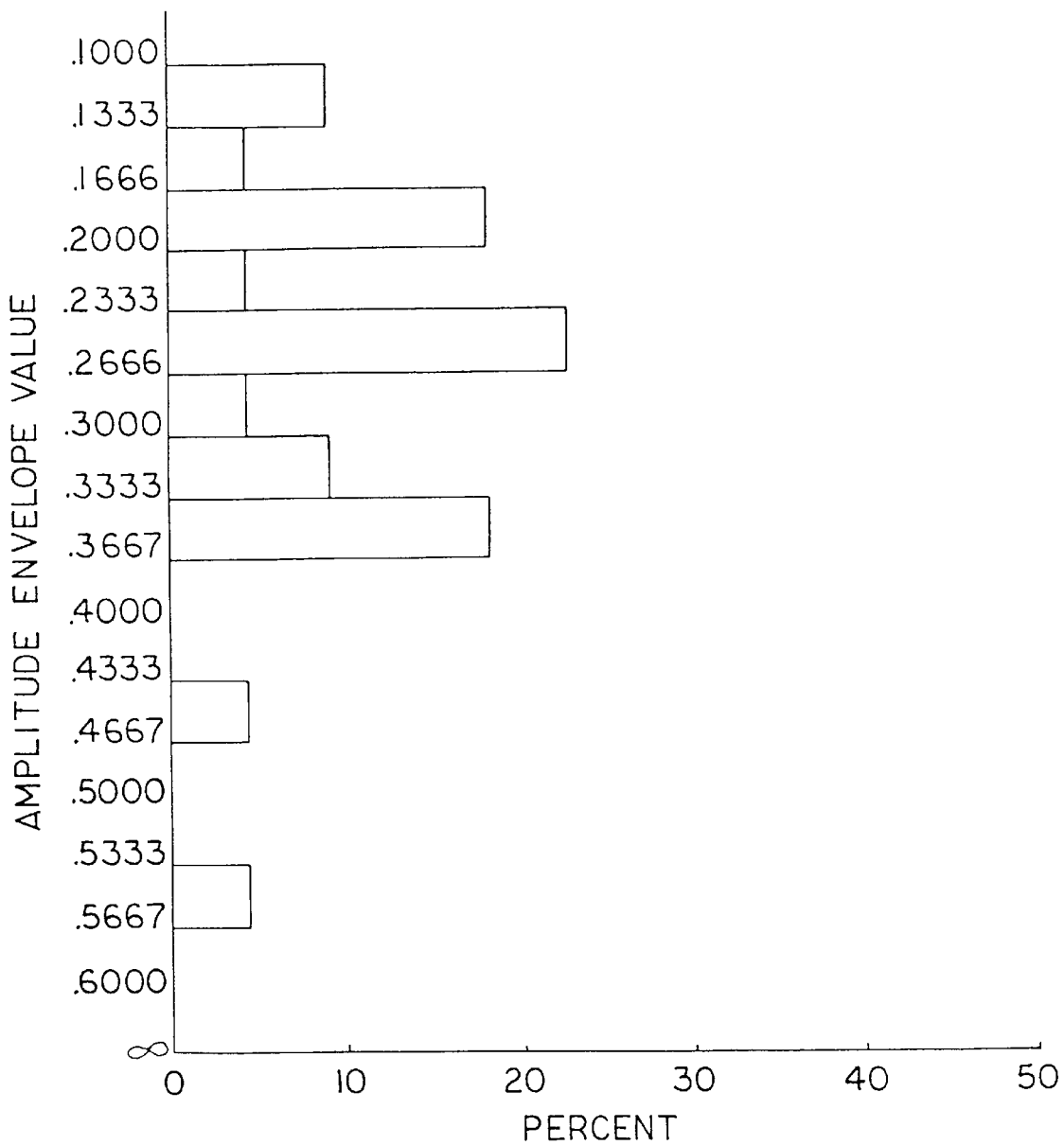

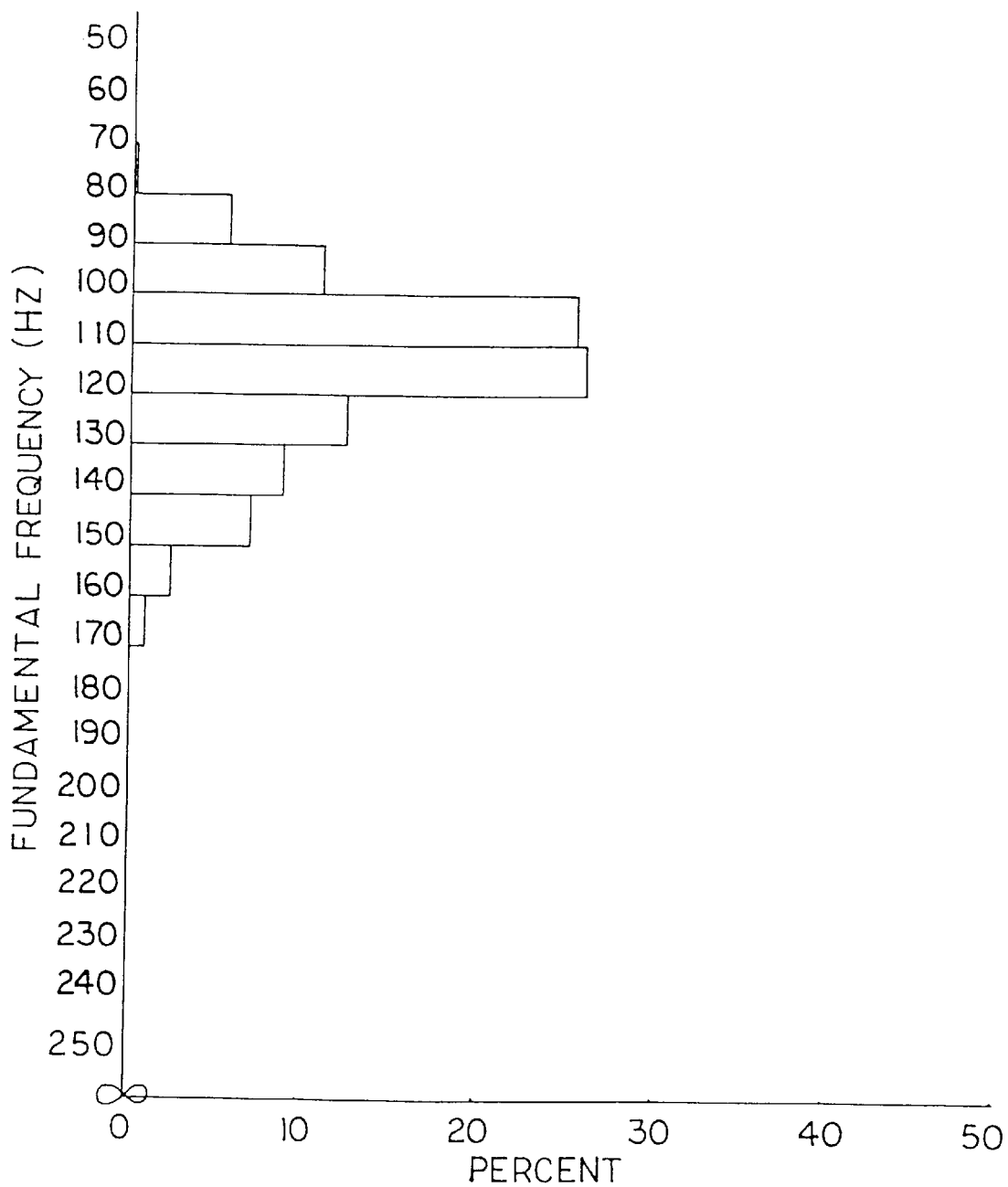

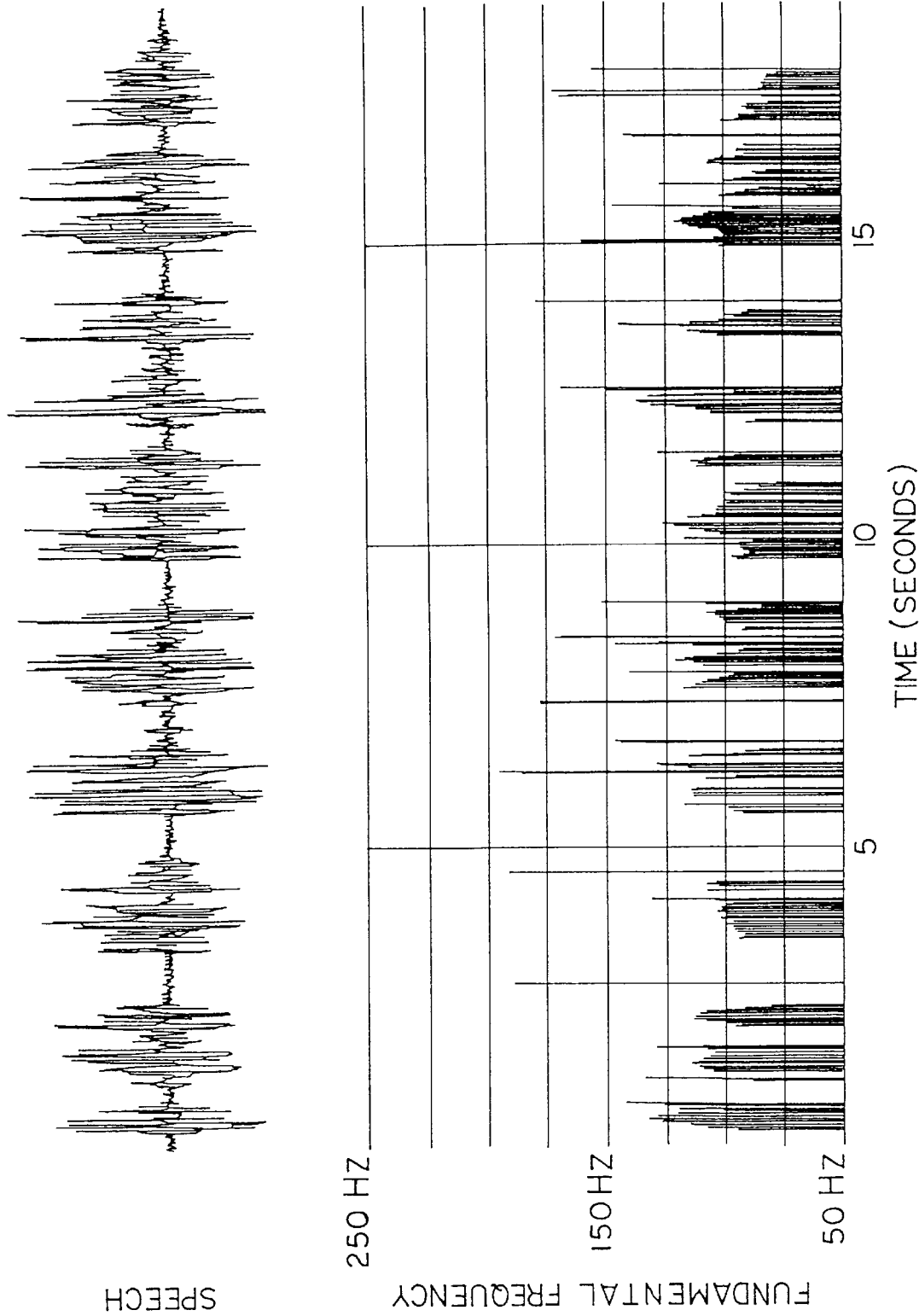

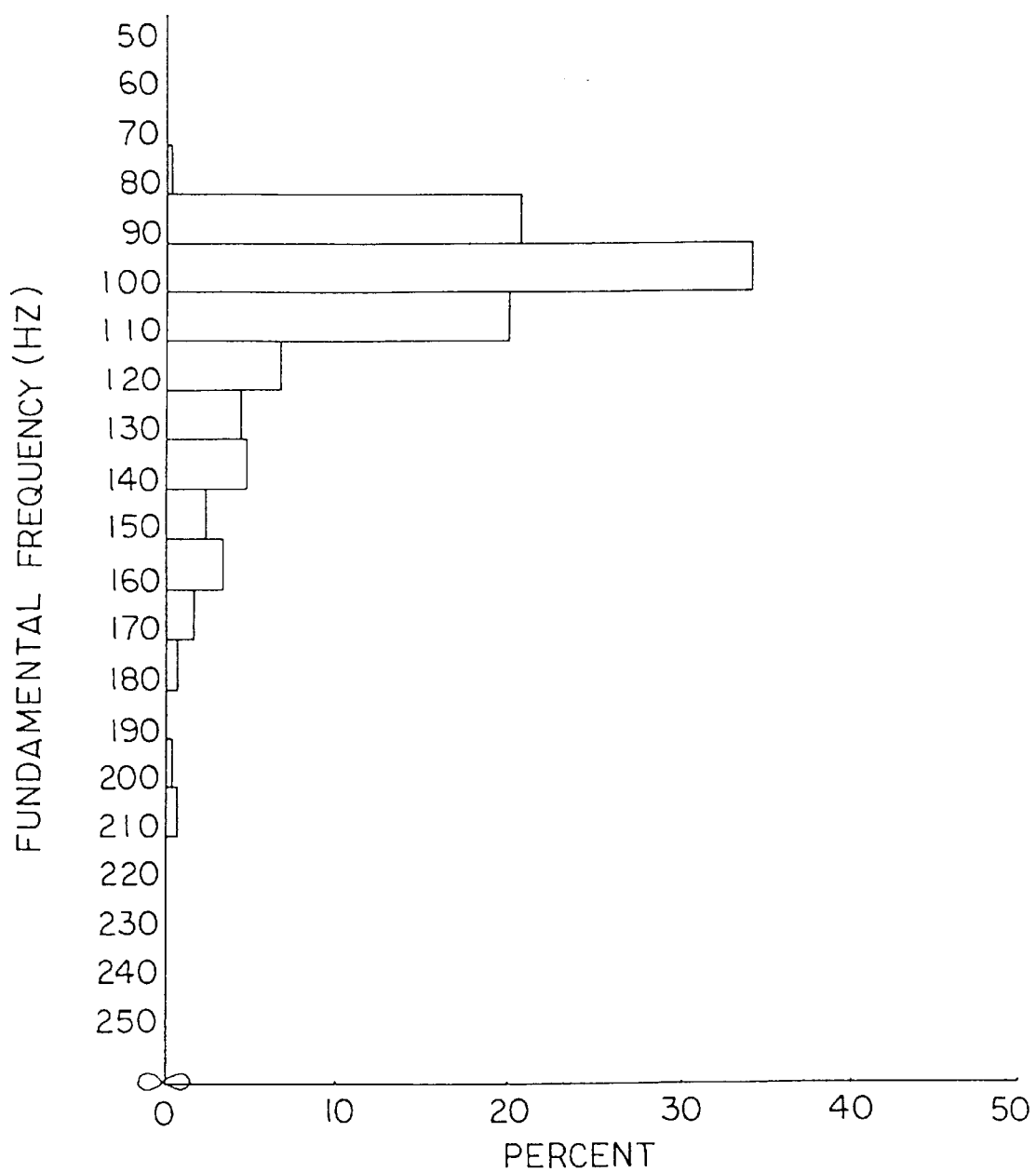

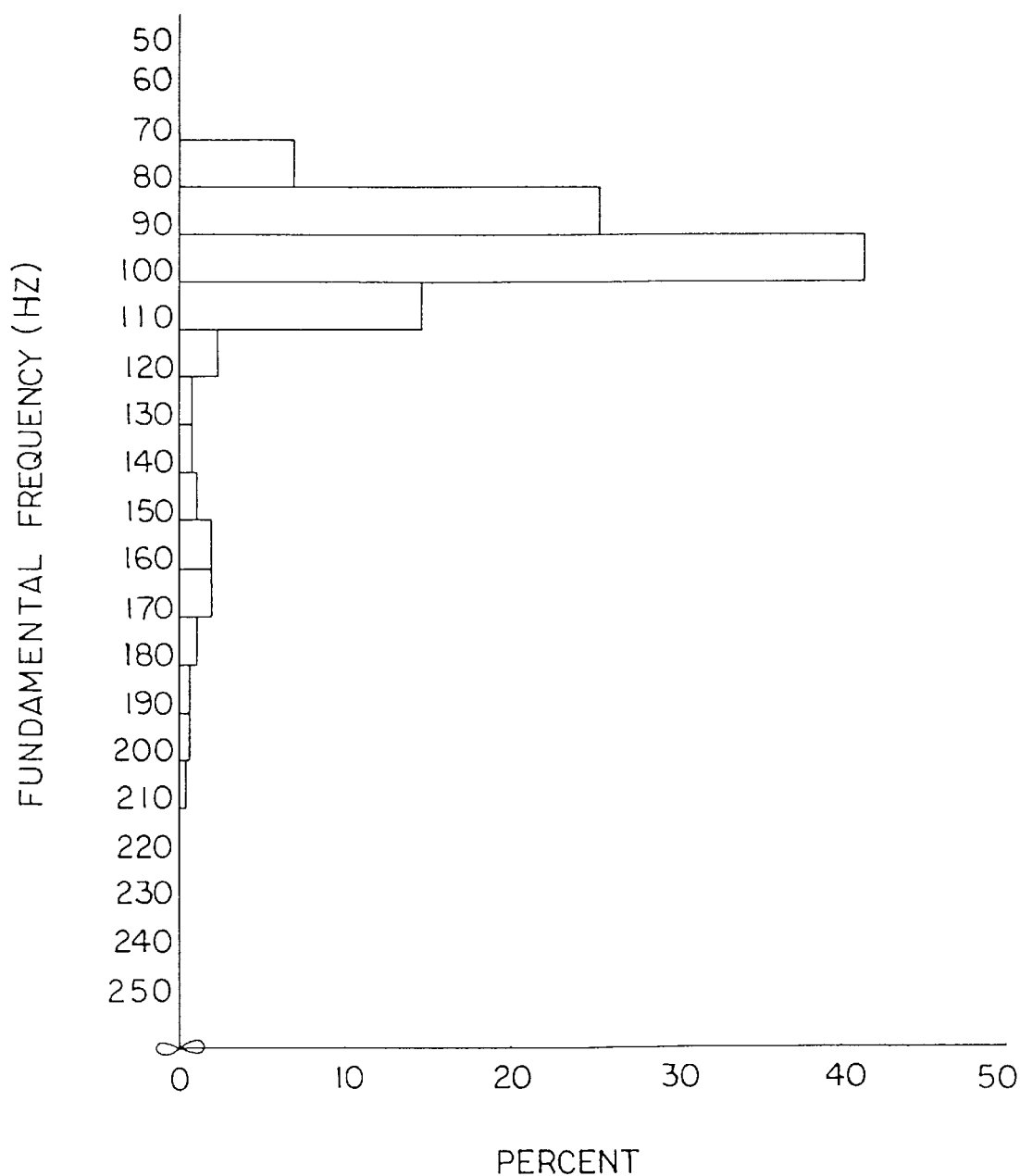

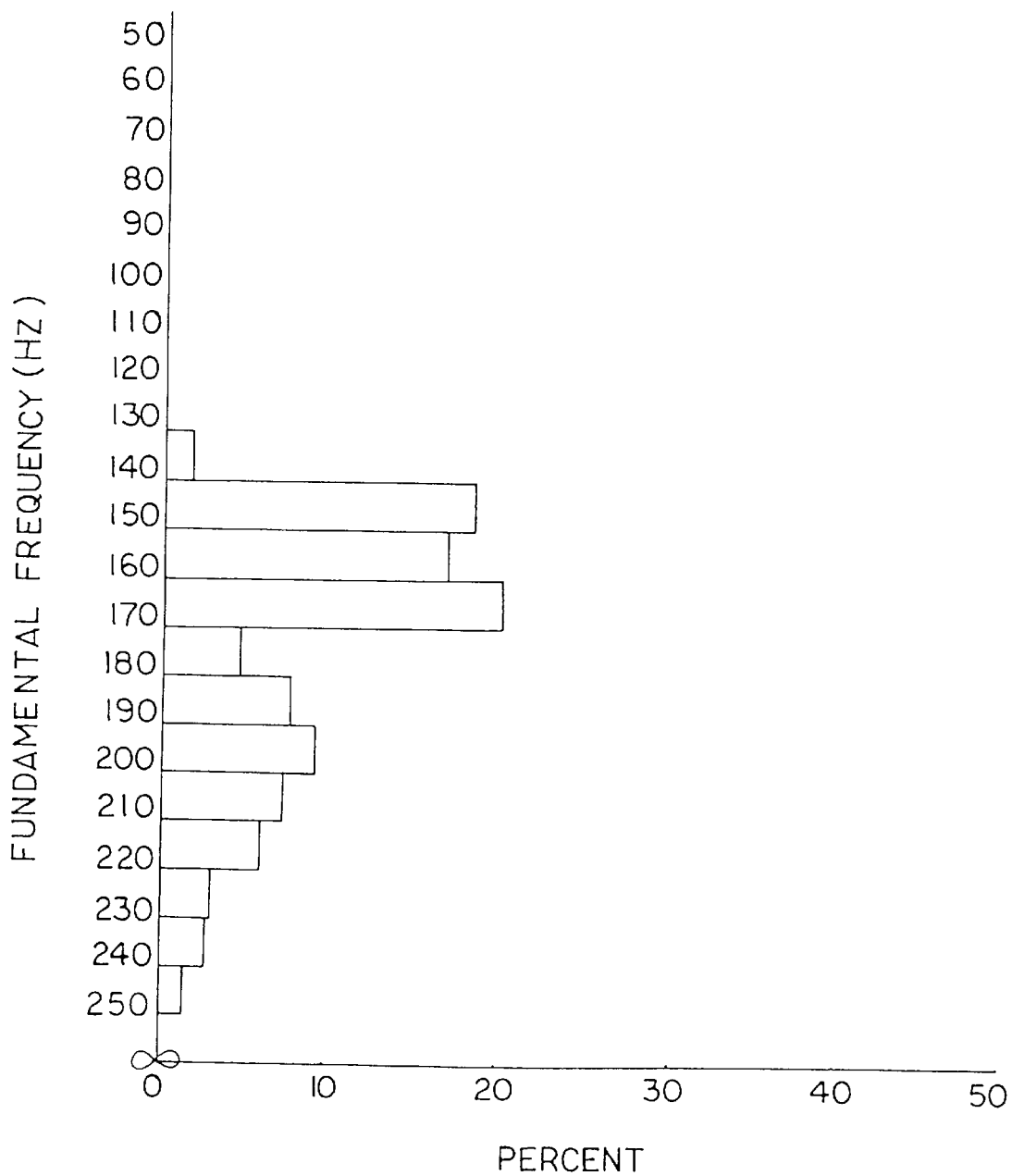

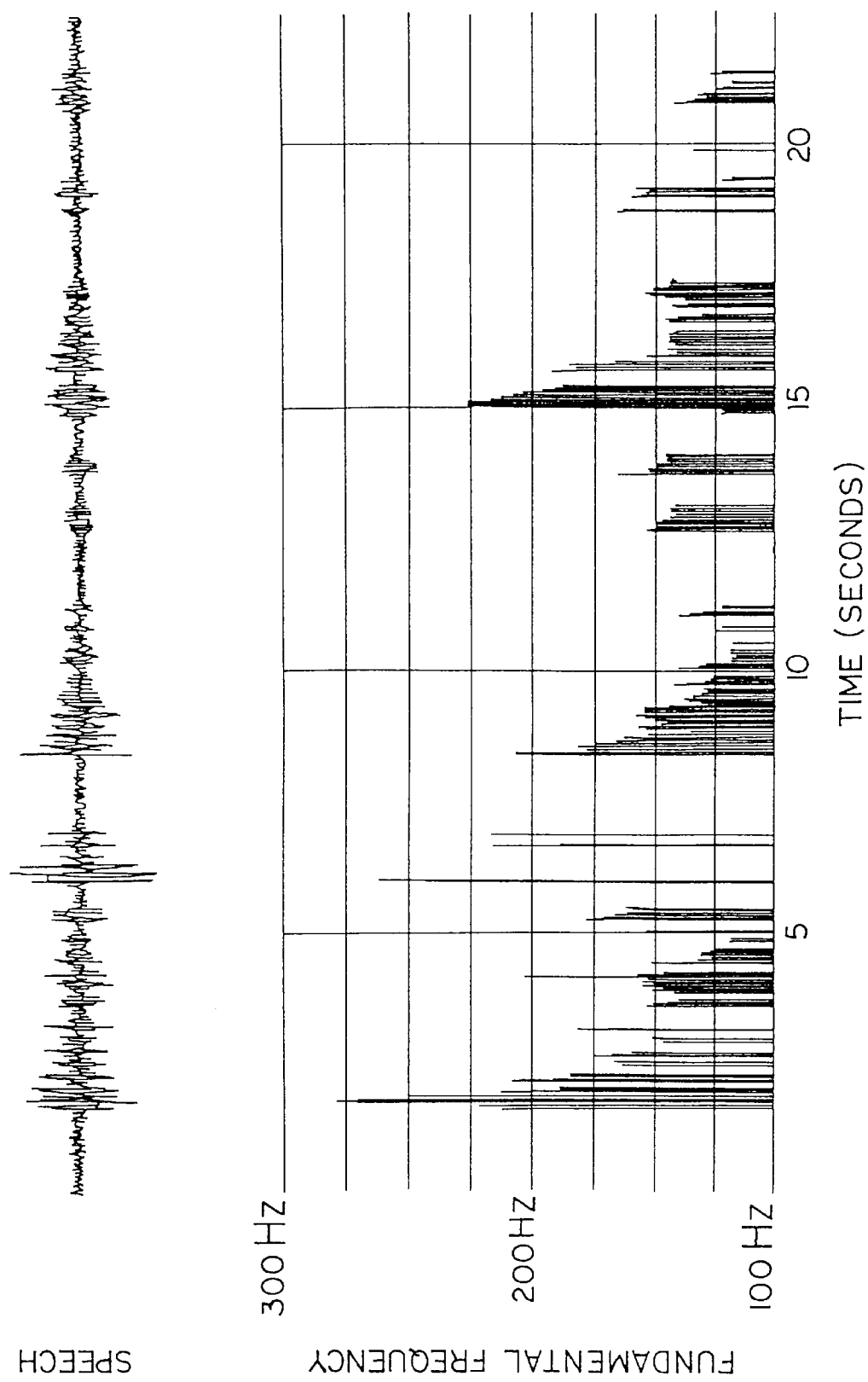

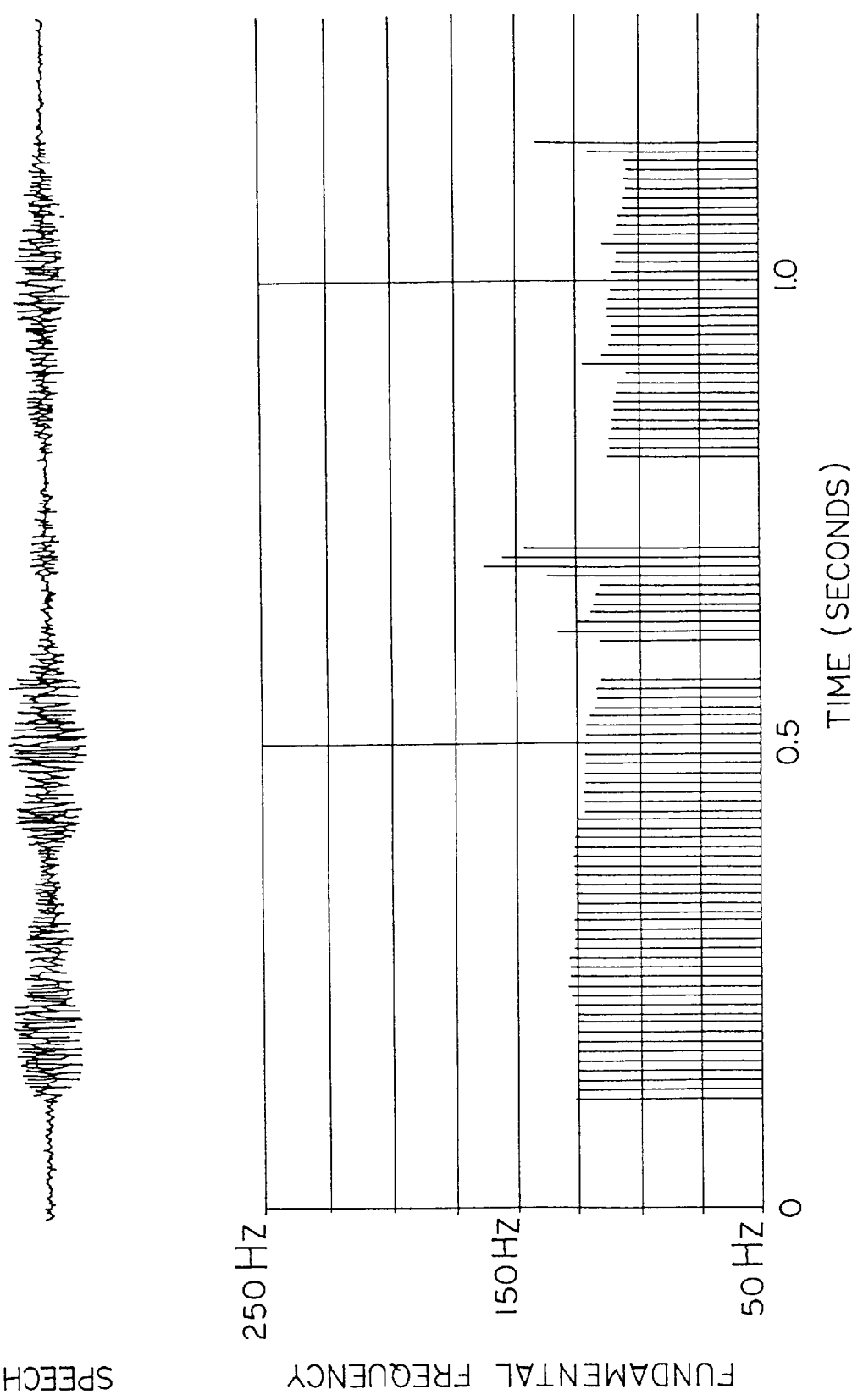

METHOD FOR DETECTING SUICIDAL PREDISPOSITION

CROSS-REFERENCE TO RELATED PATENT APPLICATION

This patent application is a continuation-in-part of the U.S. patent application Ser. No. 07/889,706 filed May 27, 1992 in the name of Stephen E. Silverman which in turn was a continuation of U.S. patent application Ser. No. 07/599,815 filed Oct. 18, 1990 now U.S. Pat. No. 5,148,483 which in turn was a continuation of U.S. patent application Ser. No. 07/053,949 filed May 26, 1987 now abandoned, which in turn was a continuation of U.S. patent application Ser. No. 06/522,398 filed Aug. 11, 1983, now issued as U.S. Pat. No. 4,675,904.

FIELD OF THE INVENTION

This invention relates to analysis of the human voice as an aid in detecting, diagnosing and treating psychiatric disorders and particularly in detecting suicidal predispositions.

DESCRIPTION OF THE PRIOR ART

The prior art references known to applicant and believed most relevant to the patentability of this invention are U.S. Pat. Nos. 3,278,685; 3,855,416; 3,855,417; 3,855,418; 3,971,034; 4,093,821; 4,139,732 and 4,142,067 and the following publications: "Teaching the Perception of Expressive Aspects of Vocal Communication", appearing at pages 107 through 115 of the August 1967 issue of the American Journal of Psychiatry, and "Infracontent Channels of Vocal Communications" appearing as Chapter 29 of Disorders of Communication, published in 1964 by the Association for Research in Nervous and Mental Disease. Two additional publications known to applicant, which applicant does not concede to be prior art with respect to this invention, are "Speech and Disturbances Affect" appearing as Chapter 17 in Speech Evaluation In Psychiatry, published in 1981 by Grune & Stratton, Inc. and page 8 of a recent publication entitled Medical Bulletin.

Of the patent literature, the '416, '418 and '034 patents are believed the most relevant to patentability of this invention.

'416 and '418 are directed towards lie detection by detecting emotional stress in speech by analyzing characteristics of the speech waveform. These patents are believed limited to analysis of waveforms produced upon utterance of the words "yes" and "no"; the analysis includes detecting aperiodic amplitude modulation within a preselected frequency envelope and thereafter weighing the detected amplitude modulations with a detected peak amplitude. The weighted function is displayed and compared to a preselected criteria after which the yes/no response, which produced the analyzed signal, is flagged as indicative of an untruthful answer by the subject under interrogation.

'418 teaches isolation and counting of the aperiodic amplitude modulations within the envelope and then displaying the count of the aperiodic modulation for each utterance rendered. From this an observer determines the level of emotional stress associated with a yes/no response and, therefore, whether the yes/no response was presumably truthful.

'034 is concerned with stress detection and records an utterance on a visible medium in order to identify frequency components indicative of stress. Infrasonic frequency signal, in the 8–12 Hz frequency range, which is below the audible range, is analyzed. Frequency shifts in this infrasonic signal of interest are considered to be stress indicators. Stress is allegedly detected independently of the linguistic content of the utterance.

The other patents are believed to be less relevant. '417 teaches filtering the human voice to provide a single frequency region signal, preferably in the region of the fundamental pitch of either the male or the female voice. A second frequency region of the speech signal, preferably a higher frequency region is also filtered and rectified. Peak energy values from the envelopes of the two frequency regions are stored and compared in order to determine the stress state of the patient.

'685 detects slope reversals and zero crossings of amplitude-time curves produced from utterances. '685 notes that such slope reversals and zero crossings may be used to analyze presence or absence of stress or to detect or distinguish among different words.

'821 relates to speech analysis in which pitch or frequency changes are analyzed to determine the emotional state of the speaker. A first formant frequency band, extending from the fundamental frequency to about 1,000 Hz, is analyzed to find knolls or flat spots in an FM demodulated signal of the speaker. Small differences in frequency between short adjacent knolls are taught to be indicative of depression or stress whereas large differences in frequencies between adjacent knolls are indicative of looseness or relaxation.

'732 utilizes a signal from a laryngograph which is partially clipped and rectified to produce a signal which can be smoothed with a very small time constant to give a good indication of a voice. The laryngograph produces larynx closure signals without interfering with the speech of the speaker; these are used to help deaf people learn to speak.

'067 is a continuation-in-part of '821 and teaches that a small amount of frequency modulation in a speaker's voice is indicative of mild stress while a normal level of frequency modulation indicates no stress. Appropriate lights (green, yellow and red) are turned on in response to the sensed state of stress as indicated by frequency modulation, or lack thereof, in the speaker's voice.

In the non-patent literature conceded to be prior art, "Teaching the Perception of Expressive Aspects of Vocal Communication" discloses that the human voice can be described in terms of its temporal intensity and frequency characteristics, both of which convey information concerning the speaker. The article suggests converting verbal signals to visual analogs for analysis. The speech signal is filtered and pressured speech, depression and mania are alleged to be indicated by the visible filtered representation of the voice.

"Infra-content Channels of Vocal Communication" teaches that speech intensity is a function of emotional state where the emotional state is defined by whether the speaker is giving a truthful or untruthful response to a stimulus.

These references, whether taken individually or in combination, do not suggest detecting suicidal predisposition in accordance with this invention.

OBJECTS OF THE INVENTION

A principal object of this invention is to provide a method for detecting suicidal predisposition by analyzing the voice.

Another object of this invention is to provide a method for detecting suicidal predisposition independently of linguistic content by analyzing the voice.

Yet another object of this invention is to provide several different methods, which may be practiced independently or together, for detecting suicidal predisposition by analyzing a speech signal, where the analysis is independent of the linguistic content of the speech.

SUMMARY OF THE INVENTION

This invention provides a method for detecting human suicidal predisposition using a vocal utterance, which is independent of linguistic content of the utterance.

In one embodiment the invention may begin with converting the utterance into an electrical signal having time varying amplitude and frequency representative of the utterance.

Since a reasonably pure voice signal from the person of interest is required for analysis, filtering may be necessary and/or desirable. Components of the signal may be filtered above and below preselected frequencies to obtain a signal within a preselected frequency boundaries. Non-repetitive components having amplitude above some average amplitude of the signal may be filtered out of the signal. Repetitive signal components having frequency outside frequency bandwidth of the signal may be filtered out of the signal.

Once a reasonably pure voice signal from the person of interest has been obtained, the person is then identified as suicidally predisposed if signal amplitude exhibits a substantially non-instantaneous decay to zero upon conclusion of the utterance. Alternatively, or complementally, the person is then identified as suicidally predisposed if signal amplitude modulation is low during the utterance. Alternately, or complementally, the person is then identified as suicidally predisposed if variation of fundamental frequency is low during the utterance. Alternatively, or complementally, the person is identified as suicidally predisposed if frequency of signal amplitude modulation is low during the utterance.

The invention may further include eliciting a vocal utterance and recording the utterance or otherwise converting the utterance into a digital or analog electrical signal. Signal analysis can be done in either analog or digital format. Identification of the human as suicidally predisposed, if signal amplitude exhibits substantially non-instantaneous decay to zero upon conclusion of the utterance or if signal amplitude modulation is low or if frequency of amplitude modulation is low, may be performed by preparing a display of the amplitude varying signal and visually examining the display for substantially vertical drop of the amplitude varying signal to zero upon conclusion of the utterance or for amplitude frequency modulation being low or for frequency of amplitude modulation being low, or for any of the above.

Upon identifying the individual as being suicidally predisposed on the basis of the utterance, the individual may be restrained and/or medicated, depending on the judgment of the attending physician or other medical personnel.

BRIEF DESCRIPTION OF THE DRAWINGS

FIGS. 1a–d is a block diagram, in schematic form, illustrating a series of steps which may be used to practice the invention.

FIGS. 2 through 5 are amplitude-time displays of audible vocal signals of depressed persons determined to be suicidally predisposed utilizing the invention.

FIGS. 6 through 9 are amplitude-time displays of audible vocal signals of depressed persons determined not to be suicidally predisposed utilizing the invention.

FIGS. 11A and 11B show the amplitude envelope of an analysis subject and a control, respectively, uttering the same words.

FIG. 11F presents a histogram for the control, which shows a broader distribution indicating substantially more amplitude variation.

FIGS. 12A through 19B show the fundamental frequency variation of four subjects and four controls uttering the same words. FIGS. 12A, 14A, 16A and 18A contain the speech data from the four subjects. FIGS. 12B, 14B, 16B and 18B are histograms of the fundamental frequency for each subject. FIGS. 13A, 15A, 17A and 19A contain the speech data from the four controls uttering the same words as the previous subject. FIGS. 13B, 15B, 17B and 19B present a histogram of the fundamental frequency for each control.

Table 1 summarizes descriptive statistics on the distribution of calculated fundamental frequency, including the calculated coefficient of variation, for all subjects and controls in Example 11.

DESCRIPTION OF THE PREFERRED EMBODIMENTS AND BEST MODE KNOWN FOR PRACTICING THE INVENTION

This invention provides methods for detecting suicidal predisposition in humans by analyzing vocal utterances of a human of interest. The invention detects human suicidal predisposition independently of the linguistic content of the utterance.

Several different criteria have been identified as indicative of human suicidal predisposition.

A first criterion is the character of signal amplitude decay of the utterance upon conclusion of the utterance. One aspect of the invention lies in the discovery that a substantially noninstantaneous amplitude decay, upon conclusion of an utterance, is indicative of suicidal predisposition in the individual producing the utterance.

A second criteria is the degree or amount of amplitude modulation of the utterance. A second aspect of the invention lies in the discovery that amplitude modulation of an utterance being low or less than a selected value is reliably indicative of suicidal predisposition in the individual.

A third criterion is the variation of fundamental frequency of the utterance. A third aspect of the invention lies in the discovery that a decreased variation of fundamental frequency is indicative of suicidal predisposition in the individual producing the utterance.

A fourth criterion is the frequency of amplitude modulation of the utterance. A fourth aspect of the invention lies in the discovery that a low frequency of amplitude modulation is indicative of suicidal predisposition in the individual producing the utterance.

Another aspect of the invention lies in the discovery that these four criteria may be independent; if any criterion is met, the individual is indicated to be suicidally predisposed.

Figure 1A:
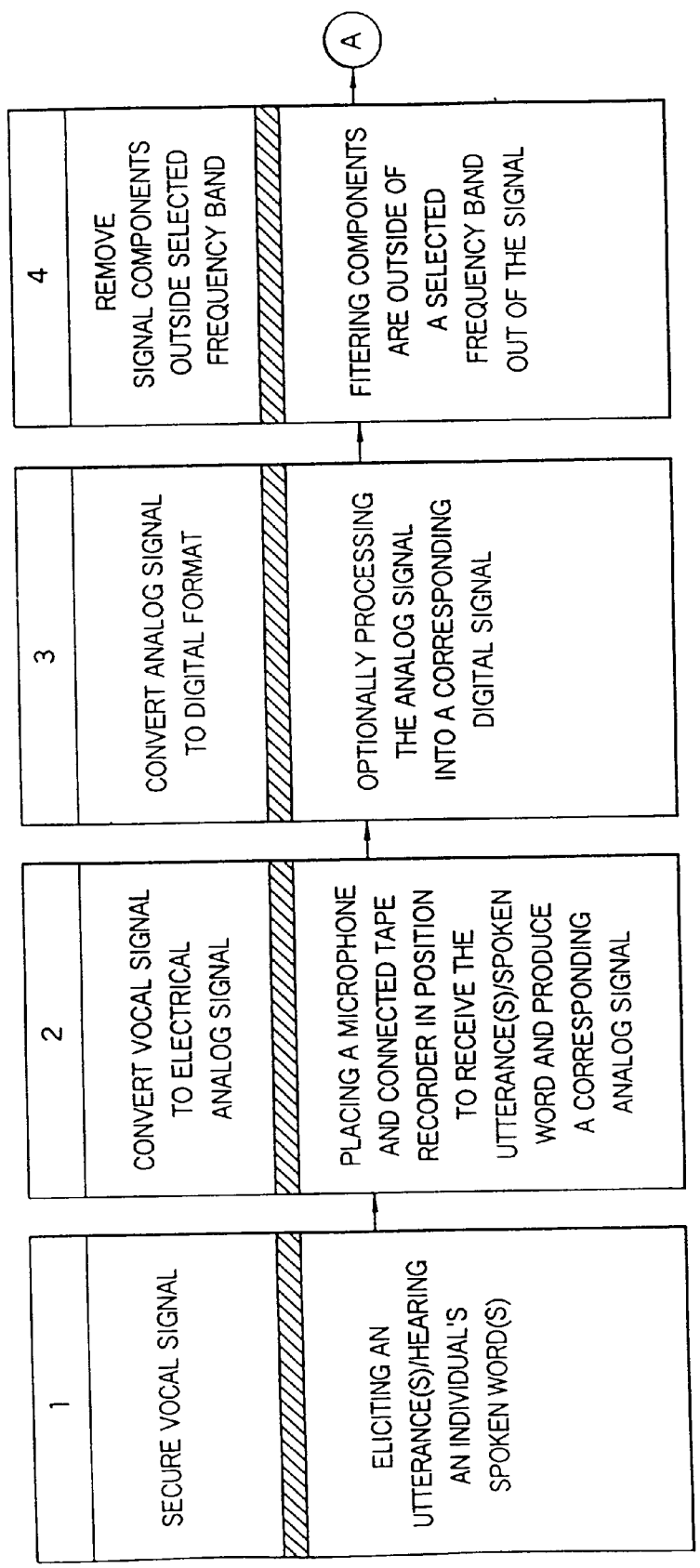
Figure 1B:
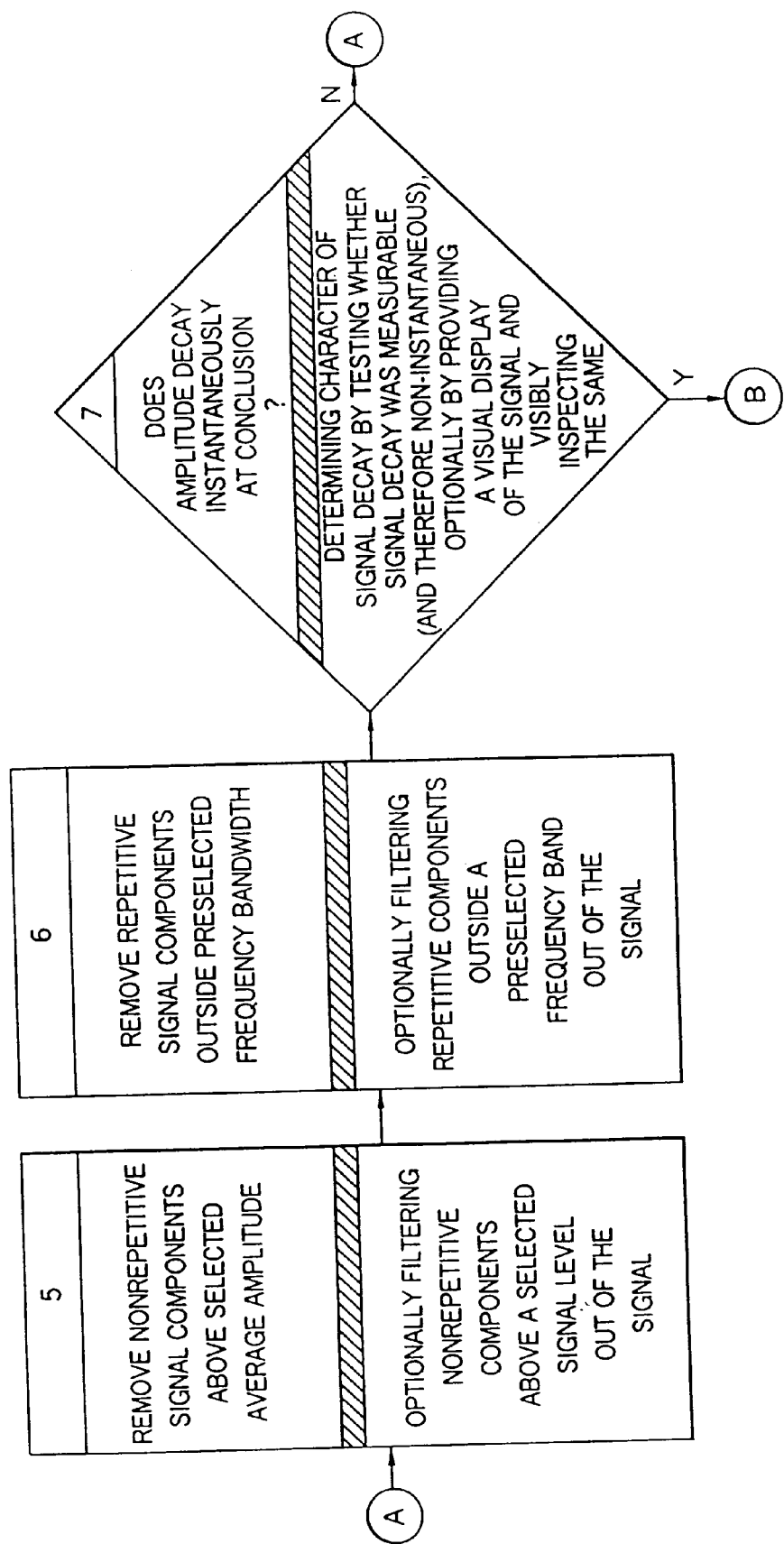
Figure 1D:
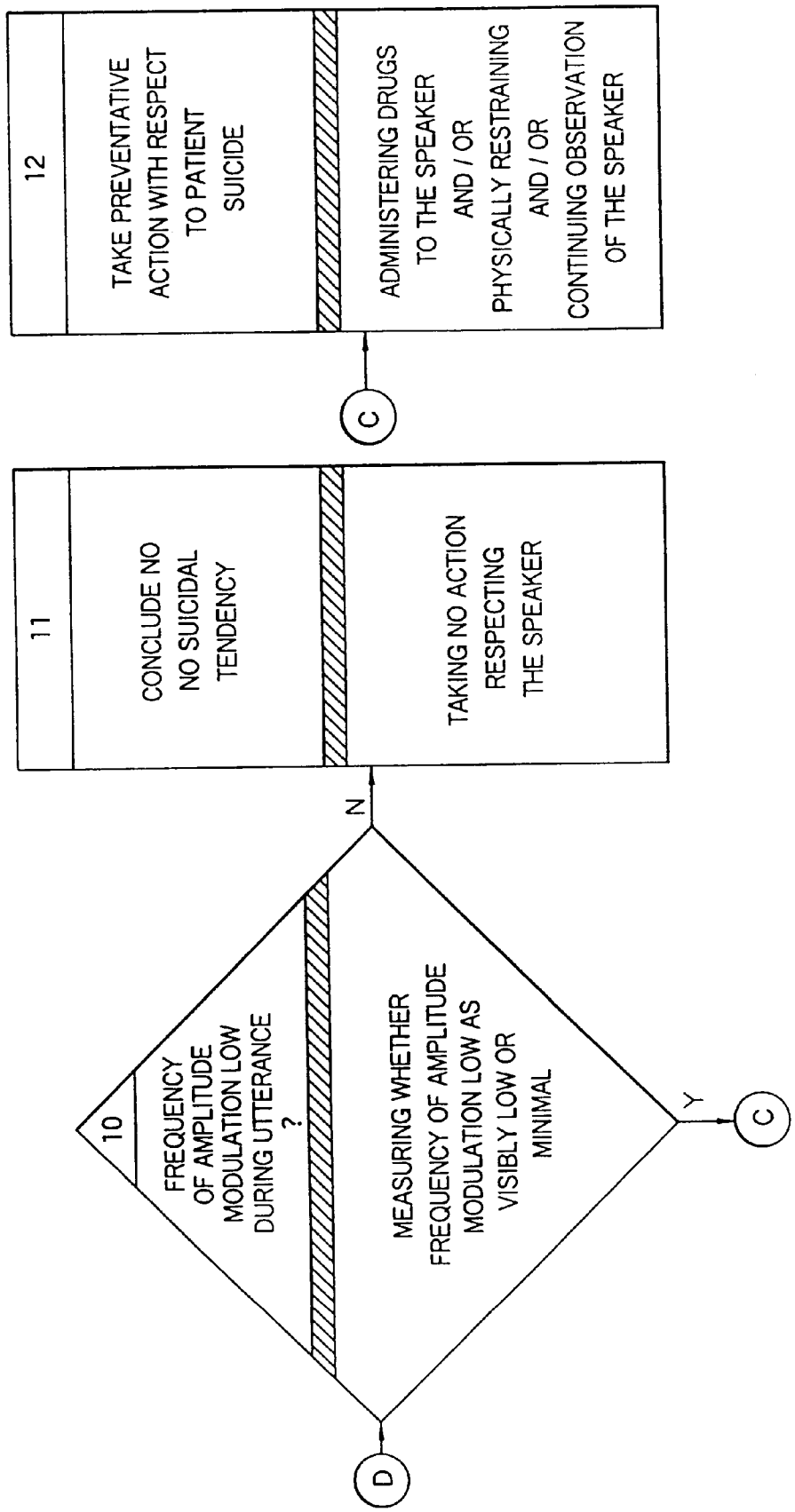

Referring to FIG. 1 there is shown in schematic block diagram form a series of steps by which the invention may be practiced. As indicated in block 1, the first step is to secure a vocal signal from an individual of interest. This may be done by actively eliciting an utterance from an individual or it may be done by passively recording the individual's voice when the individual seeks professional help, calls a suicide hotline, speaks to a physician as part of a routine physical examination such as before issuance of a life insurance policy, and the like. The utterance may be of any content; no particular words need be uttered.

As indicated in block 2, the voice signal, however obtained, is converted to an electrical signal, preferably an electrical analog signal. This may be done with a conventional microphone and tape recorder, so long as the tape recorder has adequate frequency and amplitude bandwidth to record accurately the utterance in a manner that the signal can be analyzed as to frequency content and that no clipping of amplitude variations occurs.

As indicated in block 3, the analog signal is then preferably converted to digital format, using appropriate conventional signal processing techniques. While it is not critical to practice of the invention that the signal be converted from analog to digital form, digital form is much easier to work with since conventional mathematical sampling and numerical analysis techniques are easily applied to digital signals. Hence, while digital signals are preferable, they are not critical and the invention can be practiced analyzing the analog signal so long as instruments used are sufficiently sensitive to detect the criteria discovered to be indicative of suicidal predisposition, as explained below.

As indicated by block 4 in FIG. 1, once the signal is converted to digital format, signal components outside a selected frequency band are removed. This step is performed as one of a series to isolate the digital format signal representing the utterance of interest. Removal of these signal components outside the selected frequency band is desirable to eliminate extraneous noise, such as background noise, which may unavoidably be recorded along with the utterance of interest. For example, if the utterance of interest is taken from a suicide hotline and the caller is calling from a public telephone, street noise such as automobile engines, sirens and the like may be obtained along with the signal of interest. Before analysis of the signal of interest, it is necessary to remove such extraneous signals. In one practice of the invention all signal components below 200 Hz and above 10,000 Hz have been removed from the signal.

As indicated by block 5, further processing of the utterance signal may be done before analyzing that signal for suicidal predisposition characteristics. Specifically, nonrepetitive signal components above a selected average amplitude may be removed from the signal. In one practice of the invention non-repetitive signals having amplitude above ninety percent (90%) of the average amplitude of the recorded voice signal have been removed from the signal.

As indicated by block 6, still further processing of the utterance signal may be done before analyzing that signal for suicidal predisposition indicators. Specifically, repetitive signal components outside a preselected frequency bandwidth may be removed from the signal. In one practice of the invention repetitive signals having frequency outside the ninety percent frequency bandwidth of the human voice have been removed.

This signal processing results in the finished signal being essentially the human voice of interest. Substantially all extraneous signals have been removed, yielding a digital representation of a human voice ready for analysis to determine whether the speaker is suicidally predisposed.

Upon completion of signal processing, any or all of four criteria may be used to determine whether the person rendering the vocal utterance is suicidally predisposed, as indicated by blocks 11 and 12. As indicated in block 7, one criterion which may be applied is the character of decay of the time varying amplitude upon conclusion of an utterance. Substantially instantaneous decay to zero amplitude upon conclusion of an utterance indicates absence of suicidal predisposition in the person rendering the utterance. Conversely, substantially noninstantaneous decay of the time varying amplitude signal upon conclusion of a vocal utterance indicates suicidal predisposition in the speaker.

As indicated in block 8, a second criterion by which suicidal predisposition of the speaker may be determined is the degree of amplitude modulation during a vocal utterance. Visibly high amplitude modulation during a vocal utterance indicates absence of suicidal predisposition in the person. Conversely, visibly low or minimal amplitude modulation during the vocal utterance indicates suicidal predisposition in the speaker. Stated another way, persons with thinner, less rich vocal content are reliably suicidally predisposed while persons with a richer, thicker vocal content with higher amplitude modulation may be depressed but are reliably not suicidally predisposed.

As indicated in block 9, a third criterion by which suicidal predisposition of the speaker may be determined is the degree of variation of fundamental frequency during a vocal utterance. Increased variation of fundamental frequency during a vocal utterance indicates absence of suicidal predisposition in the person. Conversely, decreased variation of fundamental frequency during the vocal utterance indicates suicidal predisposition in the speaker.

As indicated in block 10, a fourth criterion by which suicidal predisposition of the speaker may be determined is the frequency of amplitude modulation during a vocal utterance. High frequency of amplitude modulation during a vocal utterance indicates absence of suicidal predisposition in the person. Conversely, low frequency of amplitude modulation during a vocal utterance indicates suicidal predisposition in the speaker.

EXAMPLE 1

A vocal signal including several utterances was secured from a depressed person. The vocal signal was converted into an electrical analog signal and was subsequently converted to digital format. Signal components below 200 Hz and above 10,000 Hz were removed, as were non-repetitive signals having amplitude above ninety percent (90%) of the average amplitude of the recorded vocal signal. Repetitive signal components having frequencies outside the ninety percent bandwidth of the recorded signal were then removed. The resulting signal, representative of the vocal signal, was graphically displayed and recorded on strip chart recorder.

FIG. 2 is a reproduction of the strip chart recording. Noninstantaneous amplitude decay upon conclusion of each utterance is apparent. As is clearly visible in FIG. 2, the utterances, which begin at time 32 seconds, 57 seconds, 105 seconds, 131 seconds and the like, all decay substantially non-instantaneously upon conclusion. Moreover, amplitude modulation during the utterances is observed to be low. In addition, frequency of amplitude modulation during the utterances is determined to be low. The depressed person whose utterances had the signal characteristics displayed in FIG. 2 attempted suicide.

EXAMPLE 2

A vocal signal including several utterances was secured from a depressed person. The vocal signal was converted into an electrical analog signal and was subsequently converted to digital format. Signal components below 200 Hz and above 10,000 Hz were removed, as were non-repetitive signals having amplitude above ninety percent of the average amplitude of the recorded vocal signal. Repetitive signal components having frequencies outside the ninety percent bandwidth of the recorded signal were then removed. The resulting signal, representative of the vocal signal, was graphically displayed and recorded on a strip chart recorder.

Figure 3:
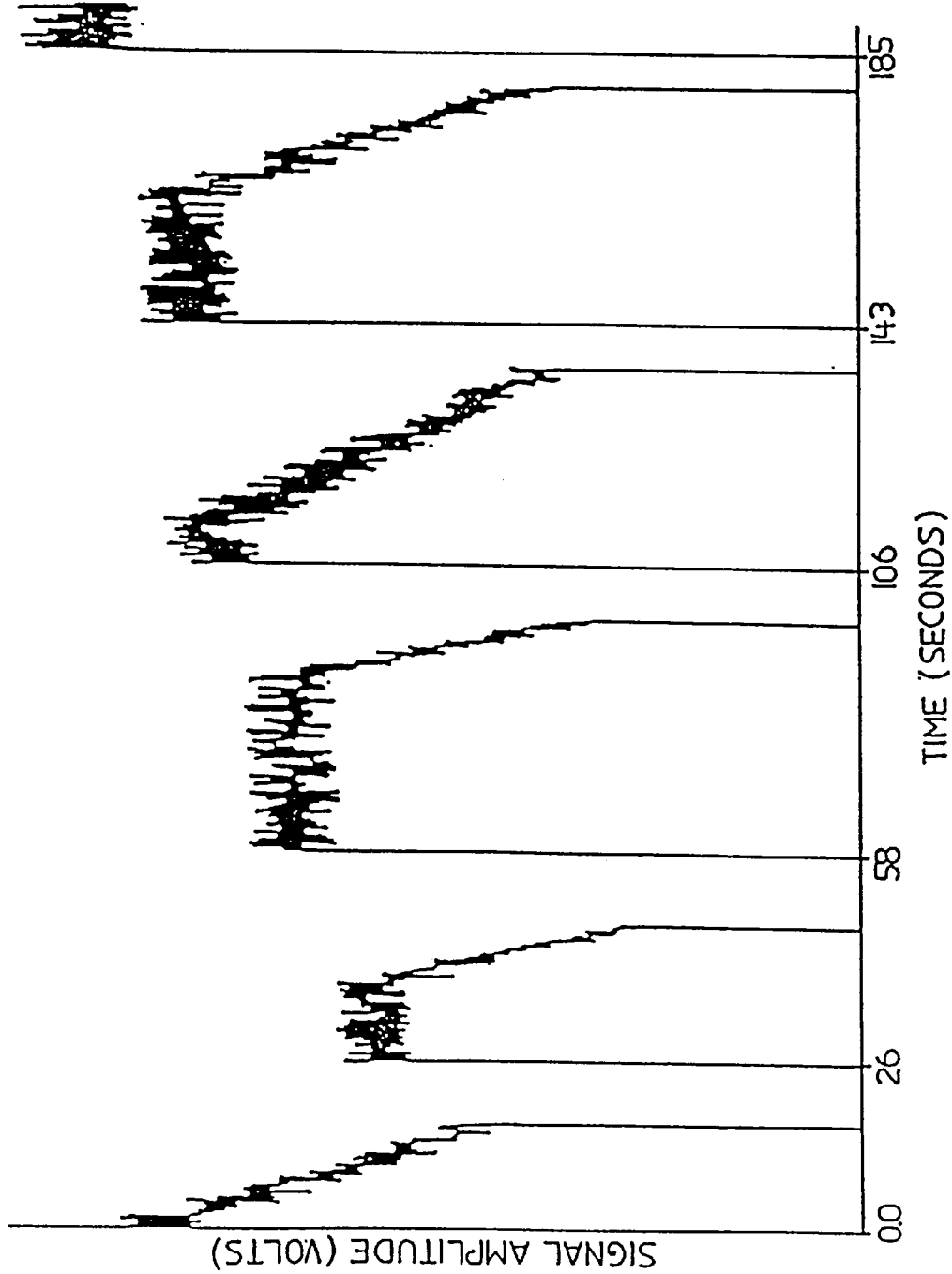

FIG. 3 is a reproduction of the strip chart recording. Noninstantaneous amplitude decay upon conclusion of each utterance is apparent. As is clearly visible in FIG. 3, the utterances, which begin at time 26 seconds, 58 seconds, 106 seconds, 143 seconds and the like, all decay substantially non-instantaneously upon conclusion. Moreover, amplitude modulation during the utterances is observed to be low. In addition, frequency of amplitude modulation during the utterances is determined to be low. The depressed person whose utterances had the signal characteristics displayed in FIG. 3 attempted suicide.

EXAMPLE 3

A vocal signal including several utterances was secured from a depressed person. The vocal signal was converted into an electrical analog signal and was subsequently converted to digital format. Signal components below 200 Hz and above 10,000 Hz were removed, as were non-repetitive signals having amplitude above ninety percent of the average amplitude of the recorded vocal signal. Repetitive signal components having frequencies outside the ninety percent bandwidth of the recorded signal were then removed. The resulting signal, representative of the vocal signal, was graphically displayed and recorded on a strip chart recorder.

Figure 4:
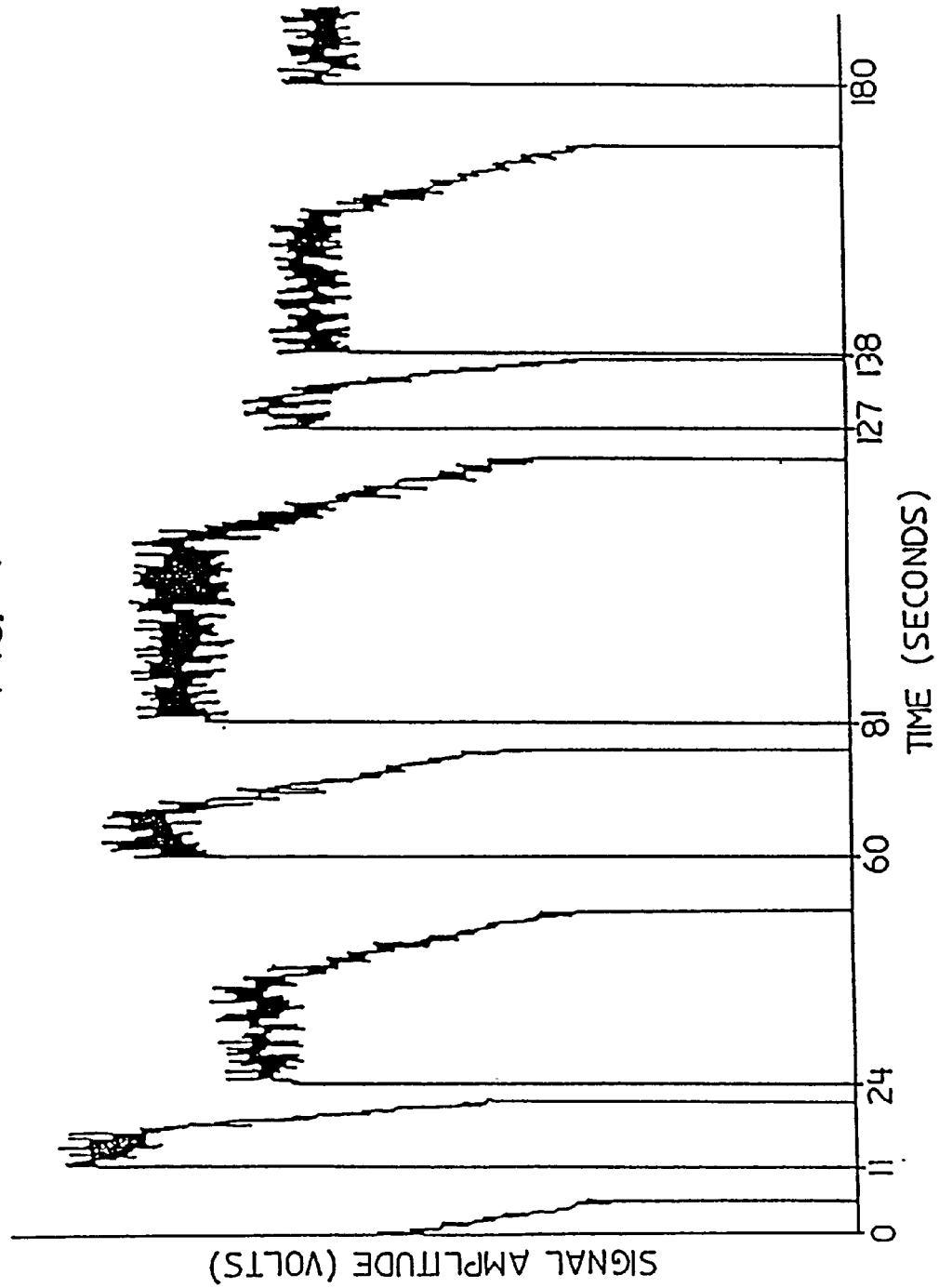

FIG. 4 is a reproduction of the strip chart recording. Noninstantaneous amplitude decay upon conclusion of each utterance is apparent. As is clearly visible in FIG. 4, the utterances, which begin at time 11 seconds, 24 seconds, 60 seconds, 81 seconds and the like, all decay substantially non-instantaneously upon conclusion. Moreover, amplitude modulation during the utterances is observed to be low. In addition, frequency of amplitude modulation during the utterances is determined to be low. The depressed person whose utterances had the signal characteristics displayed in FIG. 4 attempted suicide.

EXAMPLE 4

A vocal signal including several utterances was secured from a depressed person. The vocal signal was converted into an electrical analog signal and was subsequently converted to digital format. Signal components below 200 Hz and above 10,000 Hz were removed, as were non-repetitive signals having amplitude above ninety percent of the average amplitude of the recorded vocal signal. Repetitive signal components having frequencies outside the ninety percent bandwidth of the recorded signal were then removed. The resulting signal, representative of the vocal signal, was graphically displayed and recorded on a strip chart recorder.

Figure 5:
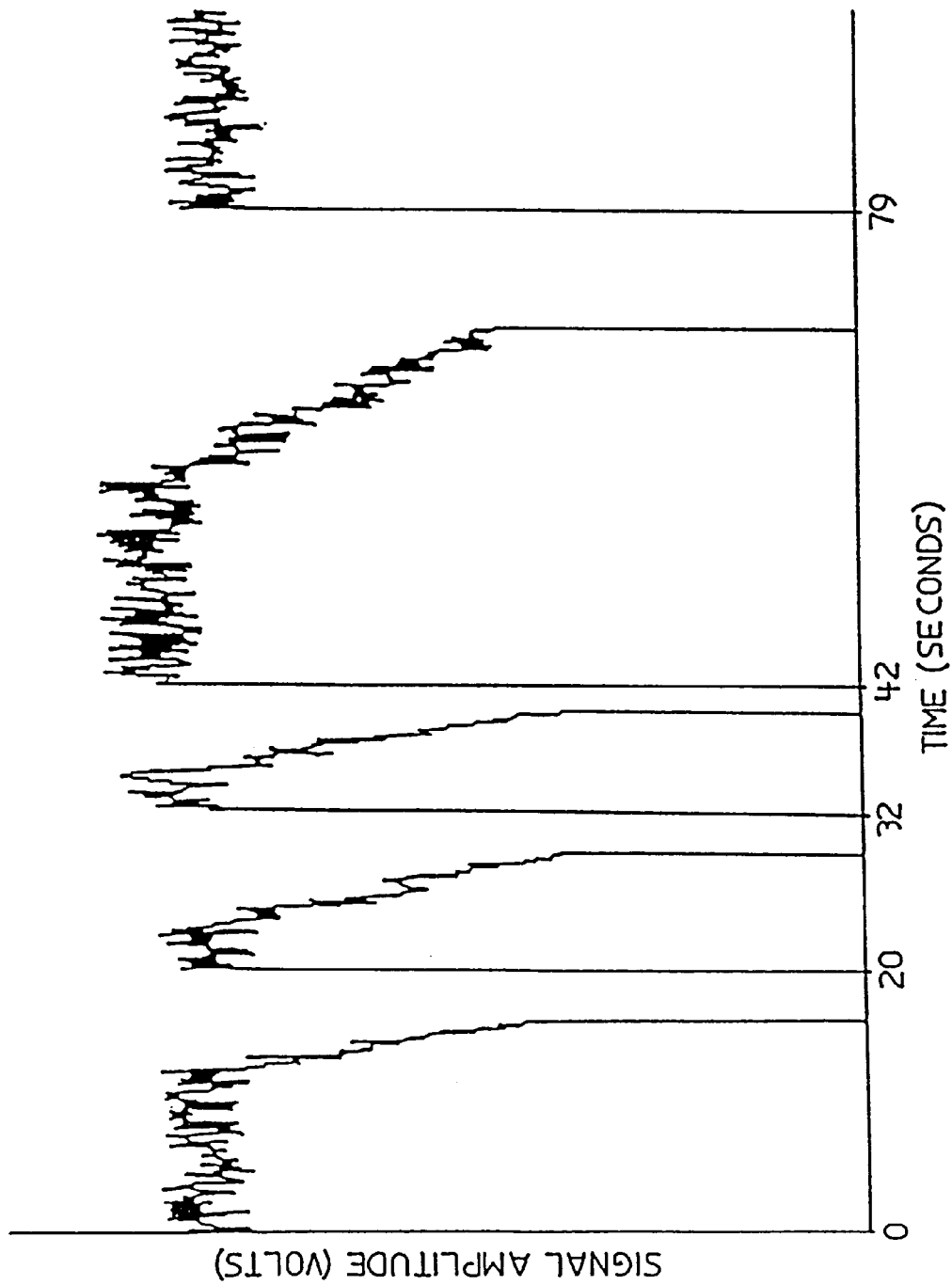

FIG. 5 is a reproduction of the strip chart recording. Noninstantaneous amplitude decay upon conclusion of each utterance is apparent. As is clearly visible in FIG. 5, the utterances, which begin at time 20 seconds, 32 seconds, 42 seconds, and the like, all decay substantially non-instantaneously upon conclusion. Moreover, amplitude modulation during the utterances is observed to be low. In addition, frequency of amplitude modulation during the utterances is determined to be low. The depressed person whose utterances had the signal characteristics displayed in FIG. 5 attempted suicide.

EXAMPLE 5

A vocal signal including several utterances was secured from a depressed person. The vocal signal was converted into an electrical analog signal and was subsequently converted to digital format. Signal components below 200 Hz and above 10,000 Hz were removed, as were non-repetitive signals having amplitude above ninety percent of the average amplitude of the recorded vocal signal. Repetitive signal components having frequencies outside the ninety percent bandwidth of the recorded signal were then removed. The resulting signal, representative of the vocal signal, was graphically displayed and recorded on a strip chart recorder.

Figure 6:
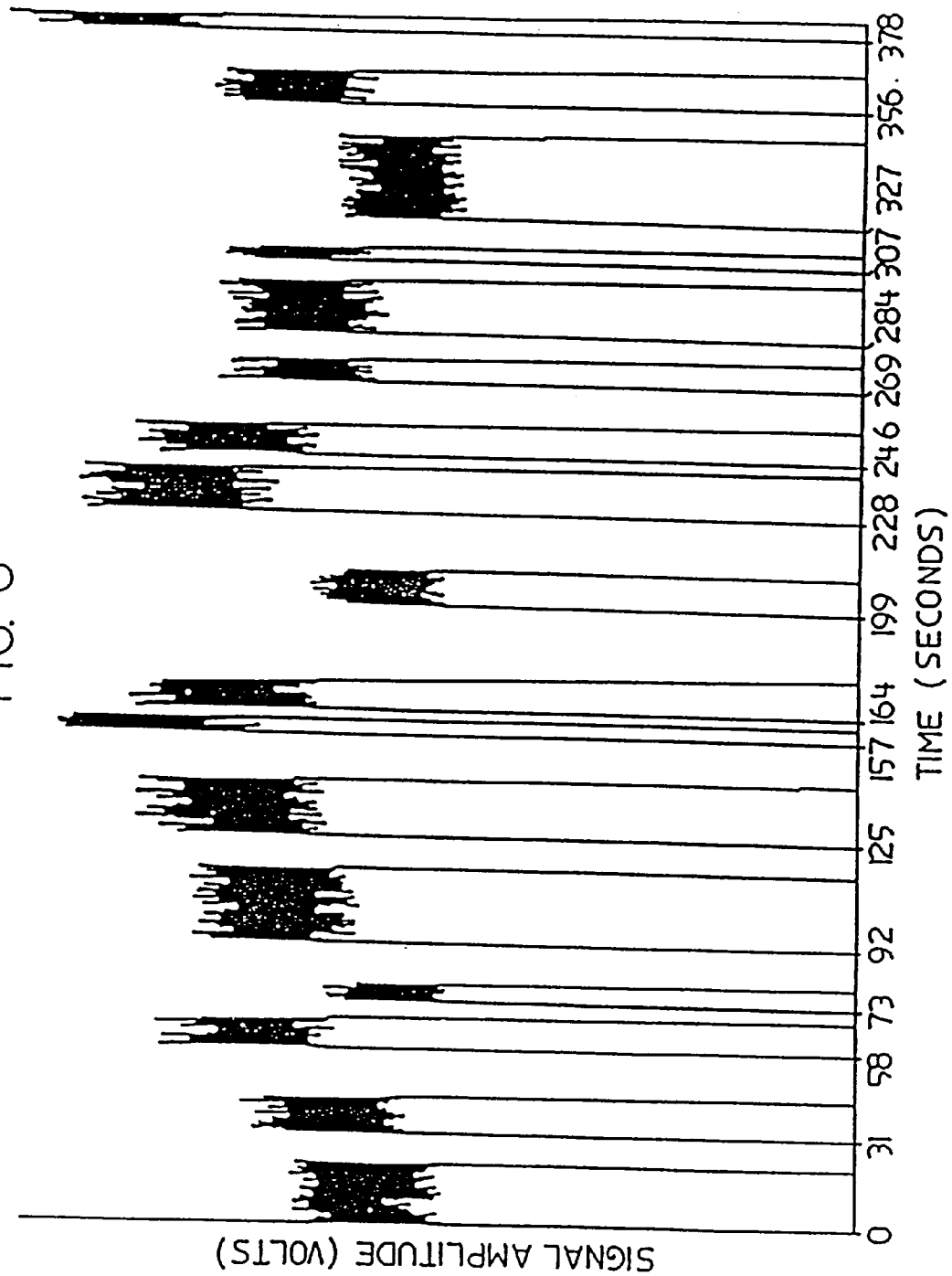

FIG. 6 is a reproduction of the strip chart recording. Substantially instantaneous amplitude decay upon conclusion of each utterance is apparent. As is clearly visible in FIG. 6, the utterances, which begin at time 31 seconds, 58 seconds, 73 seconds, 92 seconds and the like, all decay substantially instantaneously upon conclusion. Moreover, amplitude modulation during the utterances is observed to be high. In addition, frequency of amplitude modulation during the utterances is determined to be high. The depressed person whose utterances had the signal characteristics displayed in FIG. 6 did not at any time attempt suicide or in any other way exhibit suicidal tendencies or desires.

EXAMPLE 6

A vocal signal including several utterances was secured from a depressed person. The vocal signal was converted into an electrical analog signal and was subsequently converted to digital format. Signal components below 200 Hz and above 10,000 Hz were removed, as were non-repetitive signals having amplitude above ninety percent of the average amplitude of the recorded vocal signal. Repetitive signal components having frequencies outside the ninety percent bandwidth of the recorded signal were then removed. The resulting signal, representative of the vocal signal, was graphically displayed and recorded on a strip chart recorder.

Figure 7:
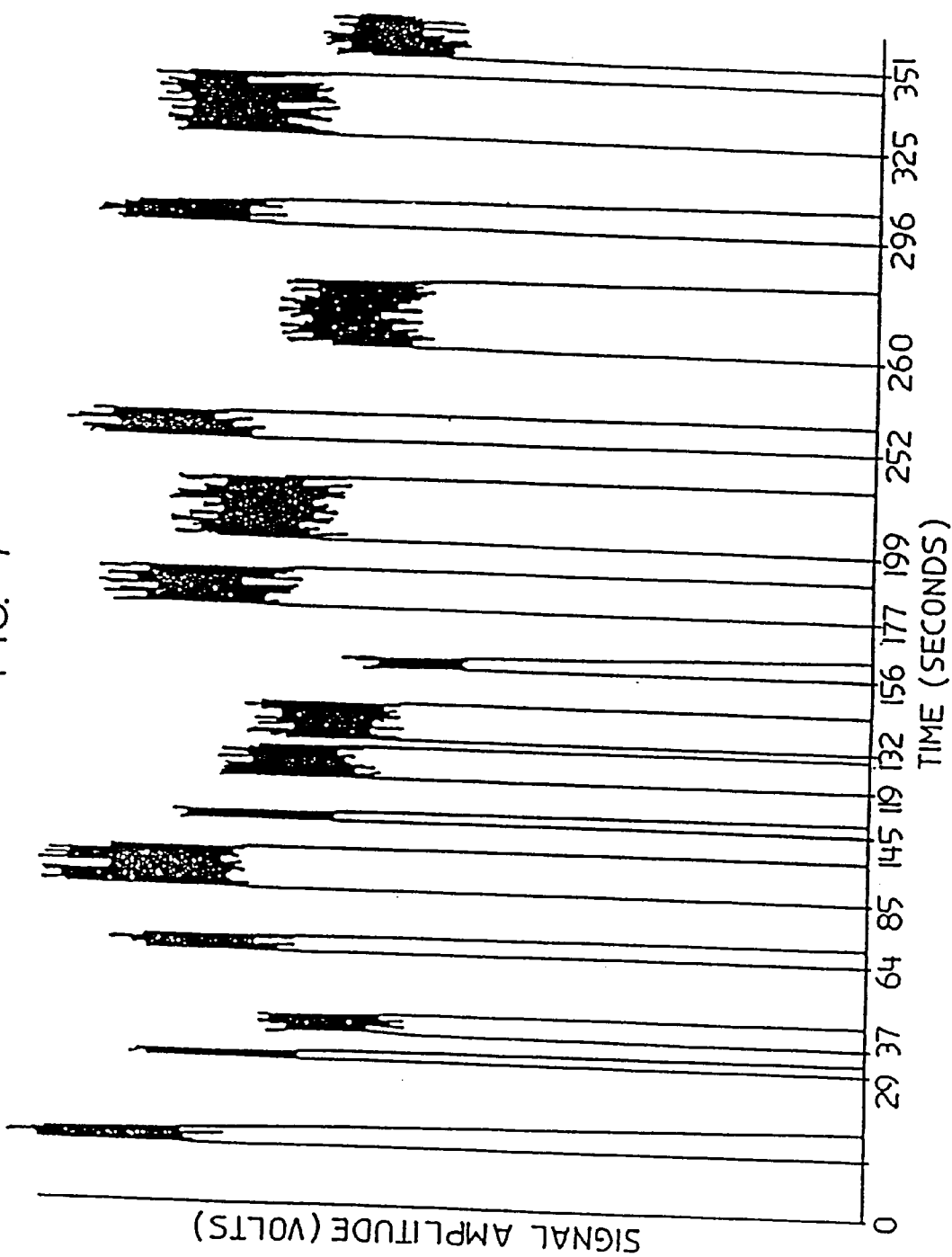

FIG. 7 is a reproduction of the strip chart recording. Substantially instantaneous amplitude decay upon conclusion of each utterance is apparent. As is clearly visible in FIG. 7, the utterances, which begin at time 29 seconds, 37 seconds, 64 seconds, 84 seconds and the like, all decay substantially instantaneously upon conclusion. Moreover, amplitude modulation during the utterances is observed to be high. In addition, frequency of amplitude modulation during the utterances is determined to be high. The depressed person whose utterance had the signal characteristics displayed in FIG. 7 did not at any time attempt suicide or in any other way exhibit any suicidal tendencies or desires.

EXAMPLE 7

A vocal signal including several utterances was secured from a depressed person. The vocal signal was converted into an electrical analog signal and was subsequently converted to digital format. Signal components below 200 Hz and above 10,000 Hz were removed, as were non-repetitive signals having amplitude above ninety percent of the average amplitude of the recorded vocal signal. Repetitive signal components having frequencies outside the ninety percent bandwidth of the recorded signal were then removed. The resulting signal, representative of the vocal signal, was graphically displayed and recorded on a strip chart recorder.

Figure 8:
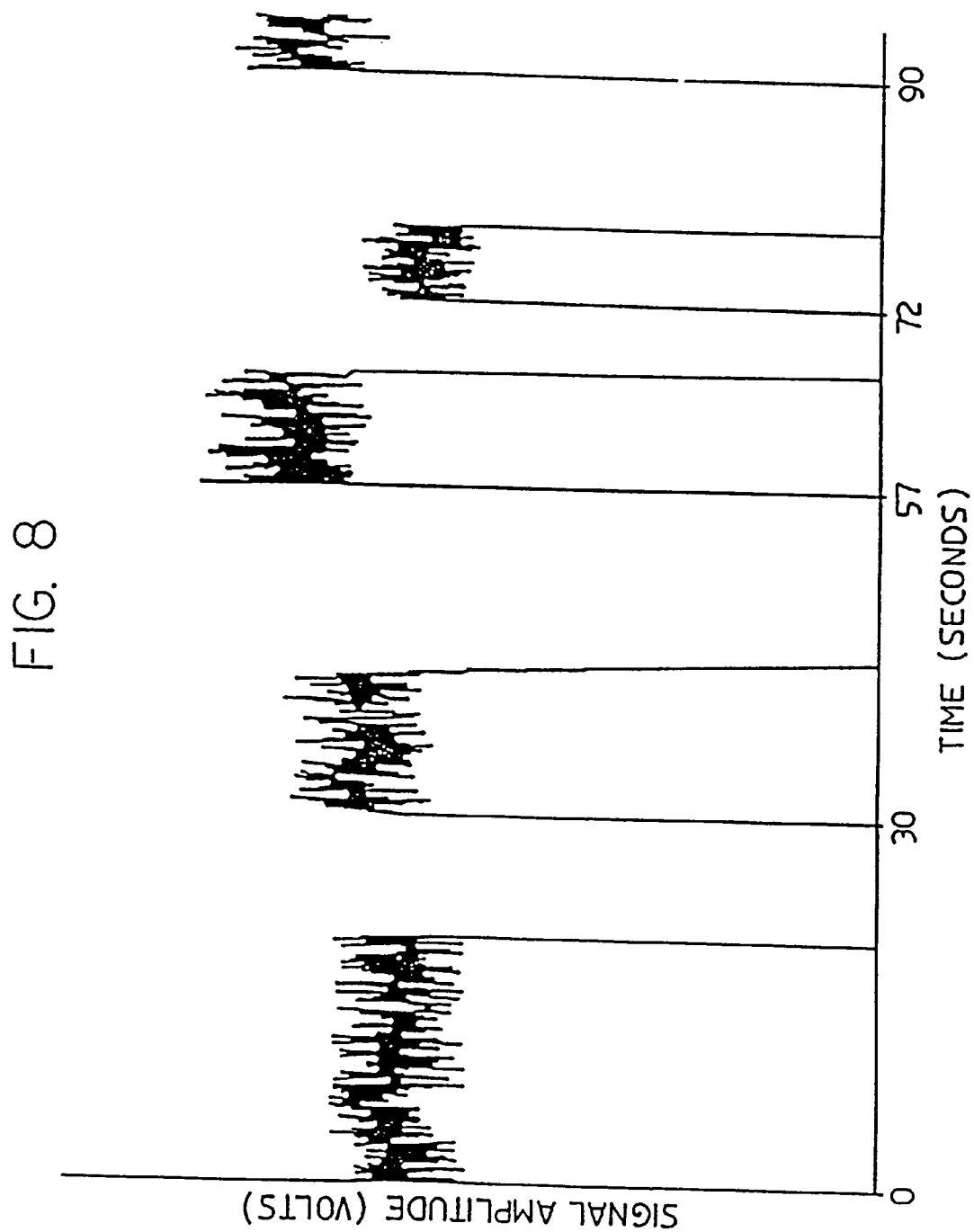

FIG. 8 is a reproduction of the strip chart recording. Substantially instantaneous amplitude decay upon conclusion of each utterance is apparent. As is clearly visible in FIG. 8, the utterances, which begin at time 30 seconds, 57 seconds, 72 seconds, and the like, all decay substantially instantaneously upon conclusion. Moreover, amplitude modulation during the utterances is observed to be high. In addition, frequency of amplitude modulation during the utterances is determined to be high. The depressed person whose utterances had the signal characteristics displayed in FIG. 8 did not at any time attempt suicide or in any other way exhibit any suicidal tendencies or desires.

EXAMPLE 8

A vocal signal including several utterances was secured from a depressed person. The vocal signal was converted into an electrical analog signal and was subsequently converted to digital format. Signal components below 200 Hz and above 10,000 Hz were removed, as were non-repetitive signals having amplitude above ninety percent of the average amplitude of the recorded vocal signal. Repetitive signal components having frequencies outside the ninety percent bandwidth of the recorded signal were then removed. The resulting signal, representative of the vocal signal, was graphically displayed and recorded on a strip chart recorder.

FIG. 9 is a reproduction of the strip chart recording. Substantially instantaneous amplitude decay upon conclusion of each utterance is apparent. As is clearly visible in FIG. 9, the utterances, which begin at time 14 seconds, 41 seconds, 47 seconds, 76 seconds and the like, all decay substantially instantaneously upon conclusion. Moreover, amplitude modulation during the utterances is observed to be high. In addition, frequency of amplitude modulation during the utterances is determined to be high. The depressed person whose utterances had the signal characteristics displayed in FIG. 9 did not at any time attempt suicide or in any other way exhibit any suicidal tendencies or desires.

EXAMPLE 9

A vocal signal including several utterances was secured from a depressed person. The vocal signal was converted into an electrical analog signal and was subsequently converted to digital format. The resulting signal, representative of the vocal signal, was graphically displayed and recorded on a digital computer.

Recorded examples were initially low-pass filtered by a 4-pole Bessel filter providing phase linear response with a cutoff frequency (−3 db down point) at 25 KHz. The audio was then passed to a 16-bit analog to digital converter operating at 64 times oversampling.

Primary signal filtering was done by a hardware digital Finite Impulse Response (FIR) phase-linear filter. The digital FIR filter had a −3 db down point at 4,800 Hz, dropping sharply above that. These circuits operated synchronously with the analog to digital converter and also performed the required "downsampling" operation to bring the actual sample rate to 10,000 Hz.

To observe vocal decay the digitized samples were processed in the following order:

Audio was anti-alias filtered and digitized at a 10,000 Hz. sample rate;

The samples were divided into 0.05 second units.

The root-mean-square average of the absolute value of the amplitude was calculated;

These levels, the amplitude envelope, were then plotted.

Figure 10A:
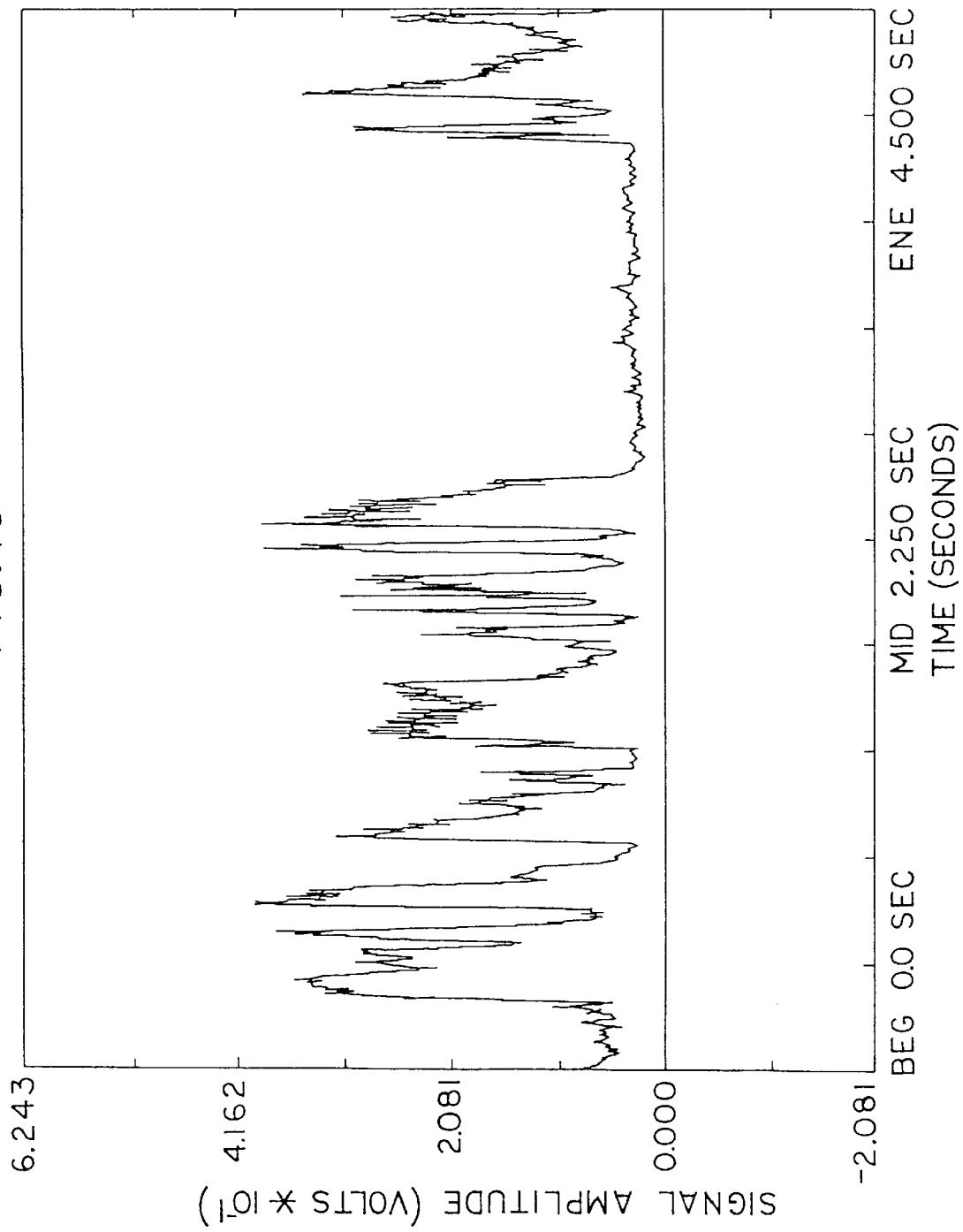
FIG. 10A is an example of non-instantaneous vocal decay.

FIG. 10A shows an example of non-instantaneous vocal decay. 4.5 seconds of data are presented. A characteristic occurrence of non-instantaneous decay is shown at two point five (2.5) seconds. The ordinate represents voltage, which indicates the loudness of sound, plotted at one-half (0.5) second intervals while the abscissa represents time.

Figure 10B:
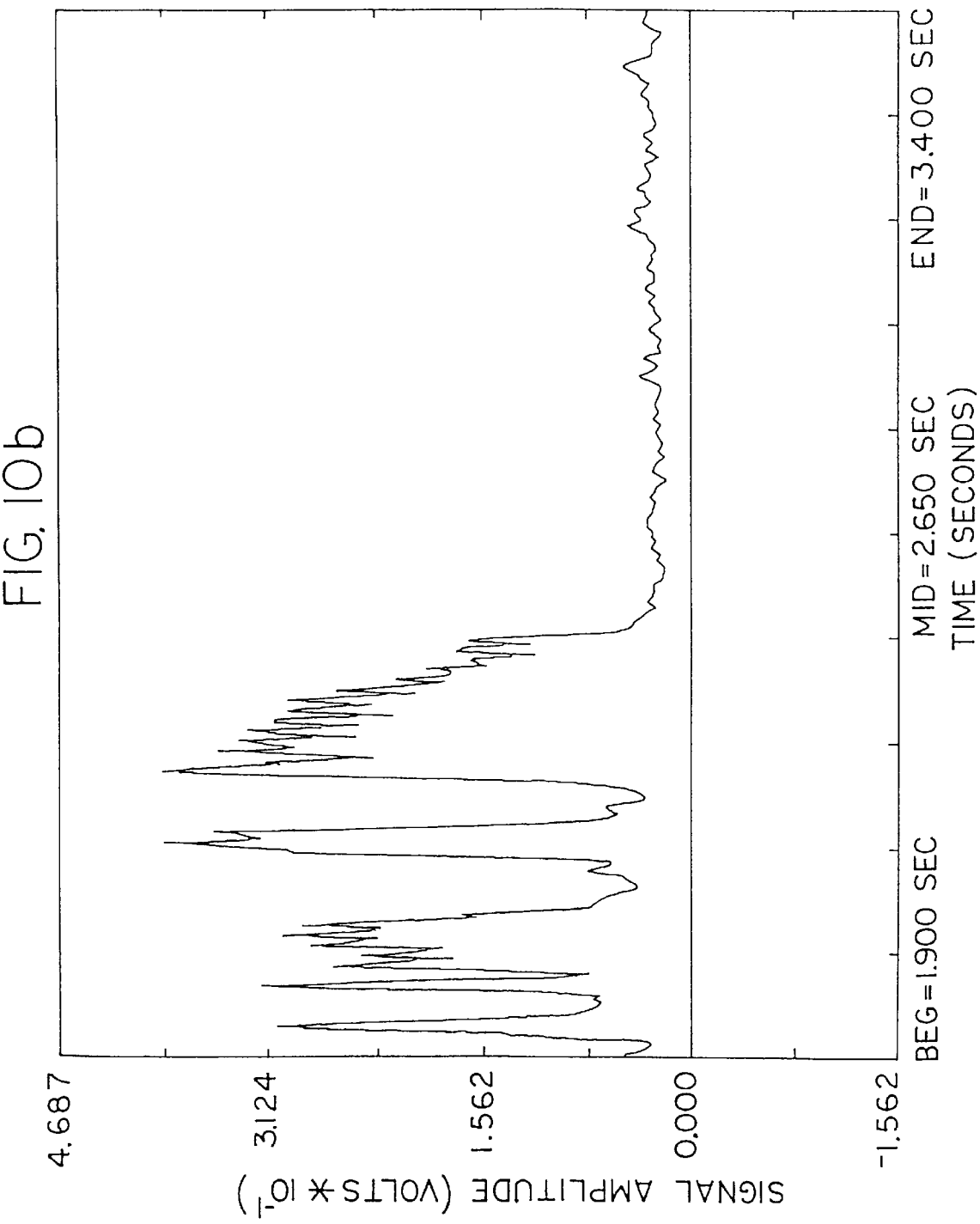
FIG. 10B presents an expanded view of the same data.

FIG. 10B presents an expanded view of the same data, the horizontal axis covering just 0.5 seconds.

Figure 10C:
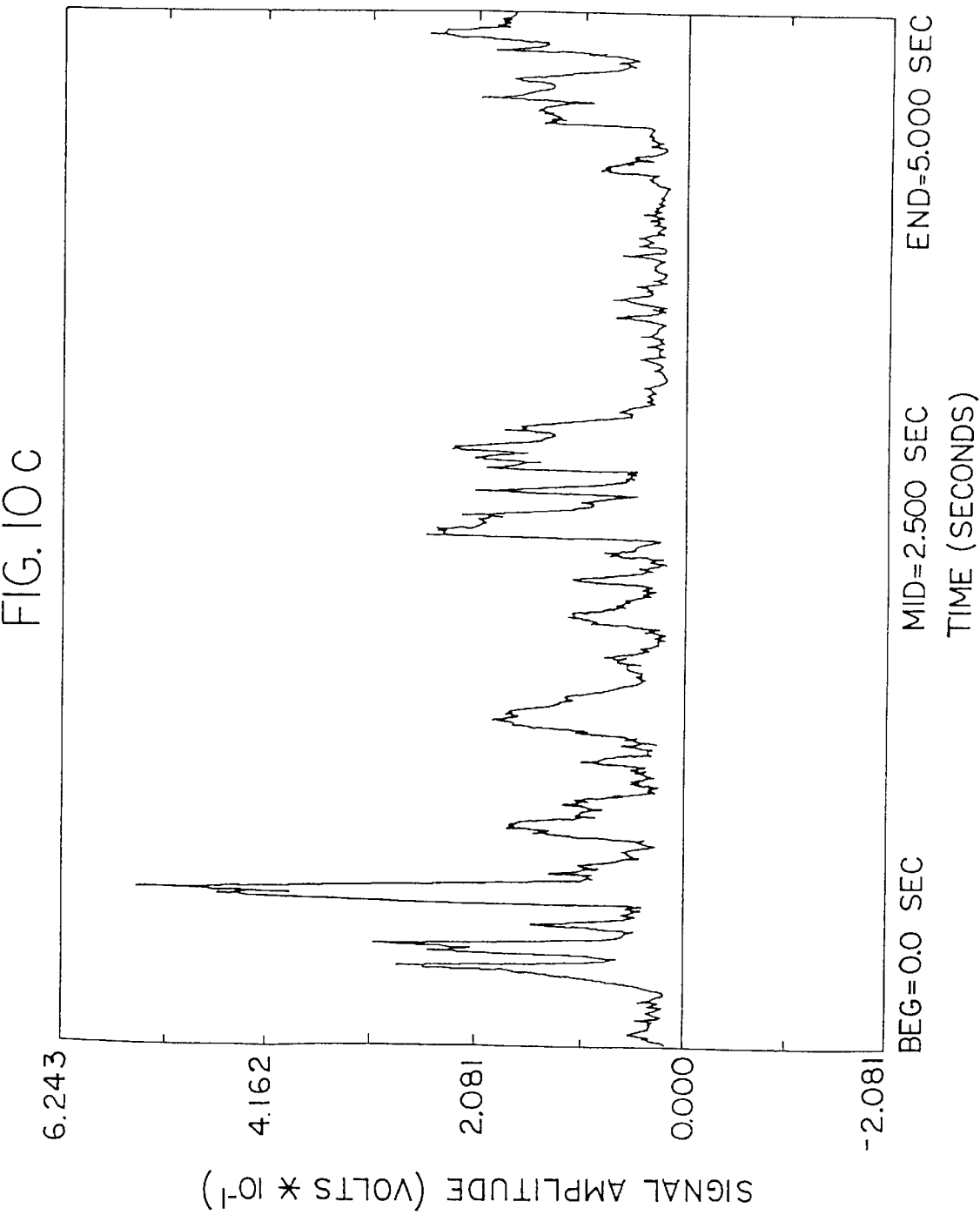
FIG. 10C shows data for a control subject making the same utterance as the analysis subject presented in FIG. 10A.

FIG. 10C shows data for a control subject making the same utterance as the analysis subject presented in FIG. 10A. Because the control had a somewhat slower speech rate, five seconds of data are included to show the same utterance.

Figure 10D:
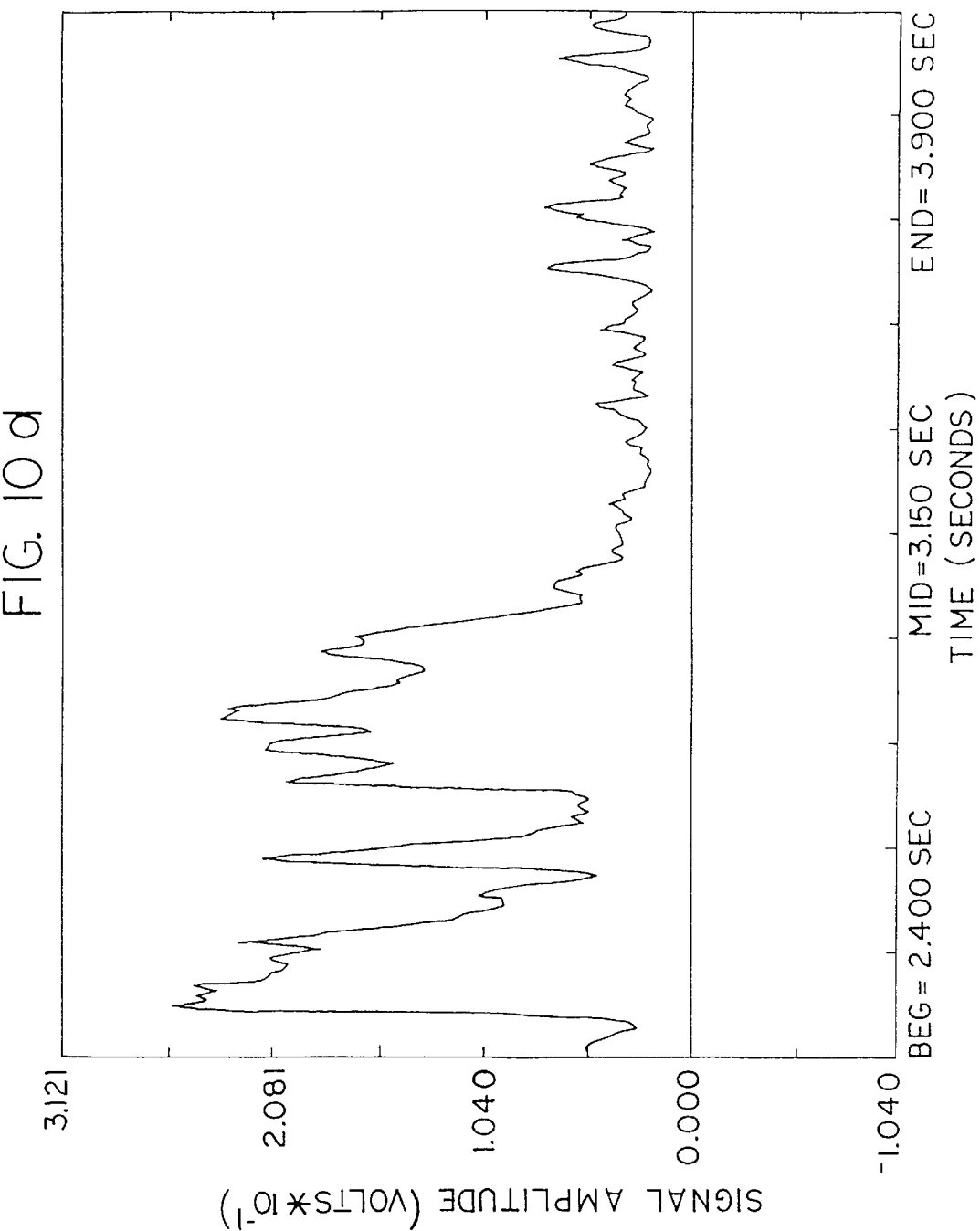
FIG. 10D presents an expanded view of the same data.

In FIG. 10C (the control), a contrasting rapid vocal decay (following a grouping of consistent peaks) is observed at three (3.0) seconds. FIG. 10D presents an expanded view of the same data, the horizontal axis covering just one-half (0.5) second.

EXAMPLE 10

A vocal signal including several utterances was secured from a depressed person. The vocal signal was converted into an electrical analog signal and was subsequently converted to digital format. The resulting signal, representative of the vocal signal, was graphically displayed and recorded on a digital computer.

Recorded examples were initially low-pass filtered by a 4-pole Bessel Filter providing phase linear response with a cutoff frequency (−3 db down point) at 25 KHz. The audio was then passed to a 16-bit analog to digital converter operating at 64 times oversampling.

Primary signal filtering was done by a hardware digital Finite Impulse Response (FIR) phase-linear filter. The digital FIR filter had a −3 db down point at 4,800 Hz, dropping sharply above that. These circuits operated synchronously with the analog to digital converter and also performed the required "downsampling" operation to bring the actual sample rate to 10,000 Hz.

To observe lack of amplitude modulation digitized samples were processed in the following order:

Audio was anti-alias filtered and digitized at a 10,000 Hz. sample rate;

The samples were divided into 0.05 second units;

The root-mean-square average of the absolute value of the amplitude was calculated. This is the amplitude envelope;

The amplitude envelope data was then divided into 0.5 second intervals;

The maximum amplitude envelope value was determined for each 0.5 second interval. These peak values were then plotted vs. time.

The maximum amplitude values for the 0.5 second intervals are then plotted in a histogram to show the amount of variation of the amplitude. In these histograms, low values (which correspond to the background noise between words) are ignored.

Figure 11A:
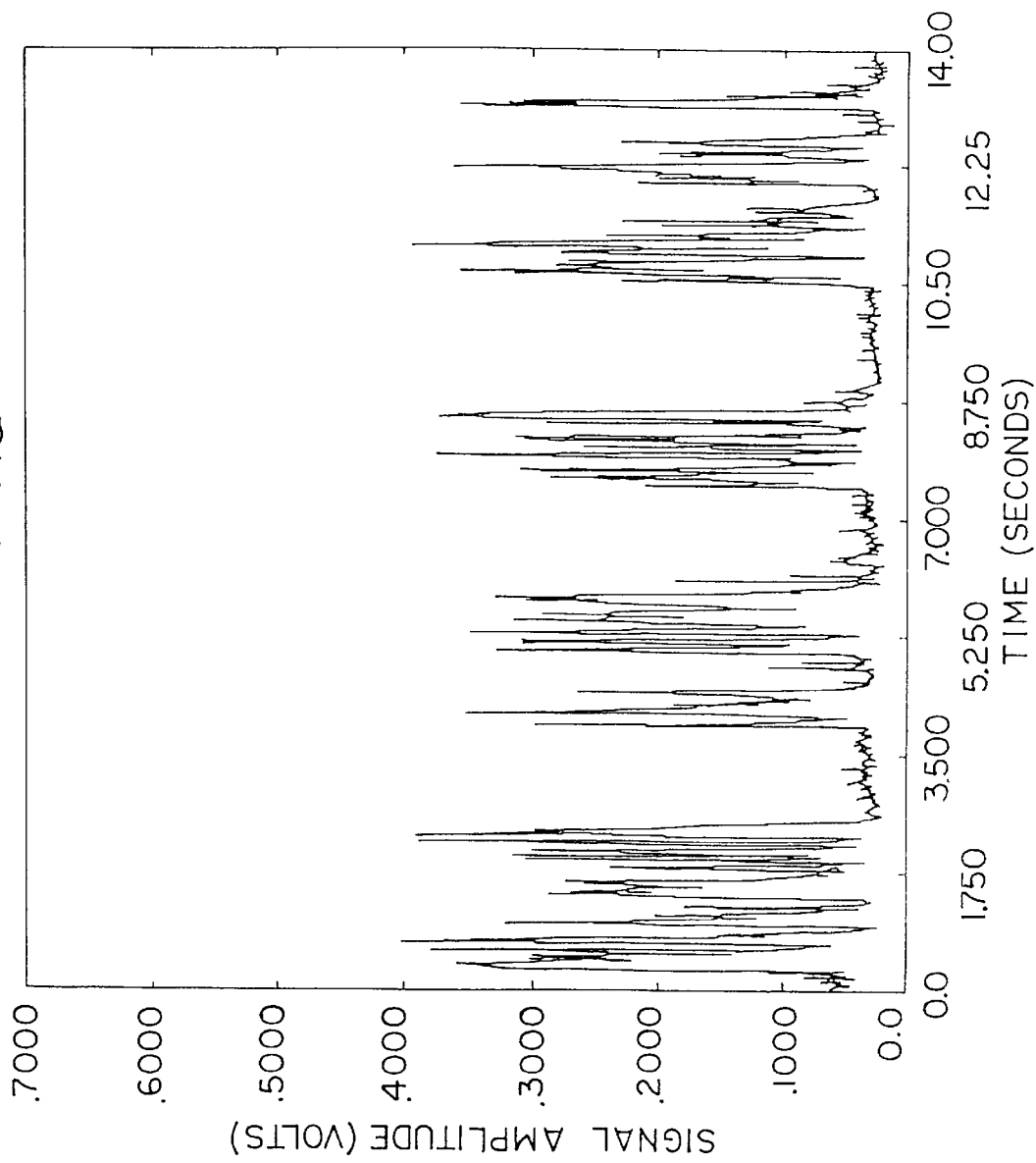

The amplitude envelope of an analysis subject is shown in FIG. 11A. The amplitude envelope of a control uttering the same words is shown in FIG. 11B.

Figure 11C:
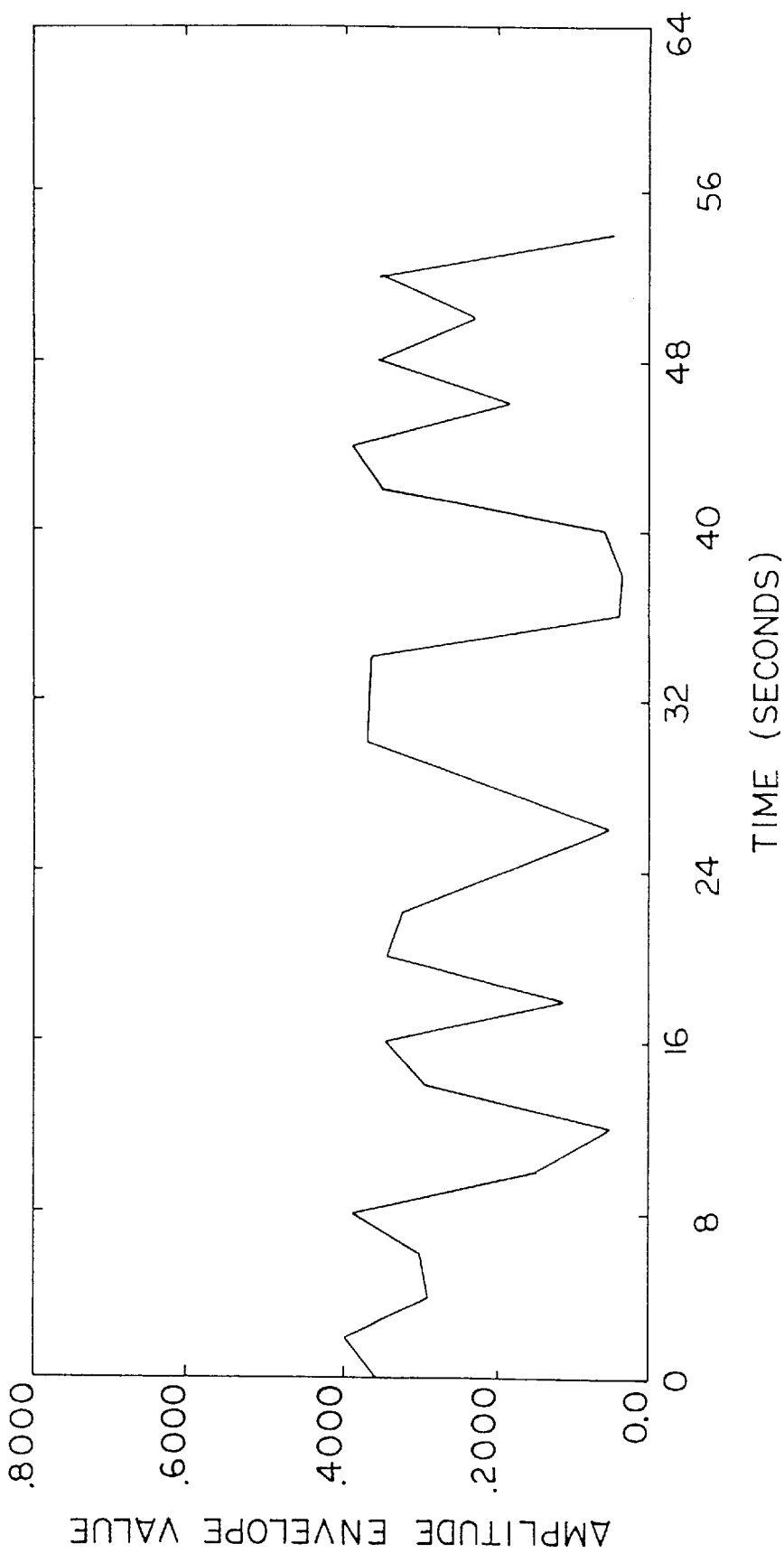
FIGS. 11C and 11D present the maximum amplitude envelope of an analysis subject and a control uttering the same words, where the value for each one-half (0.5) second interval is plotted.
Figure 11D:
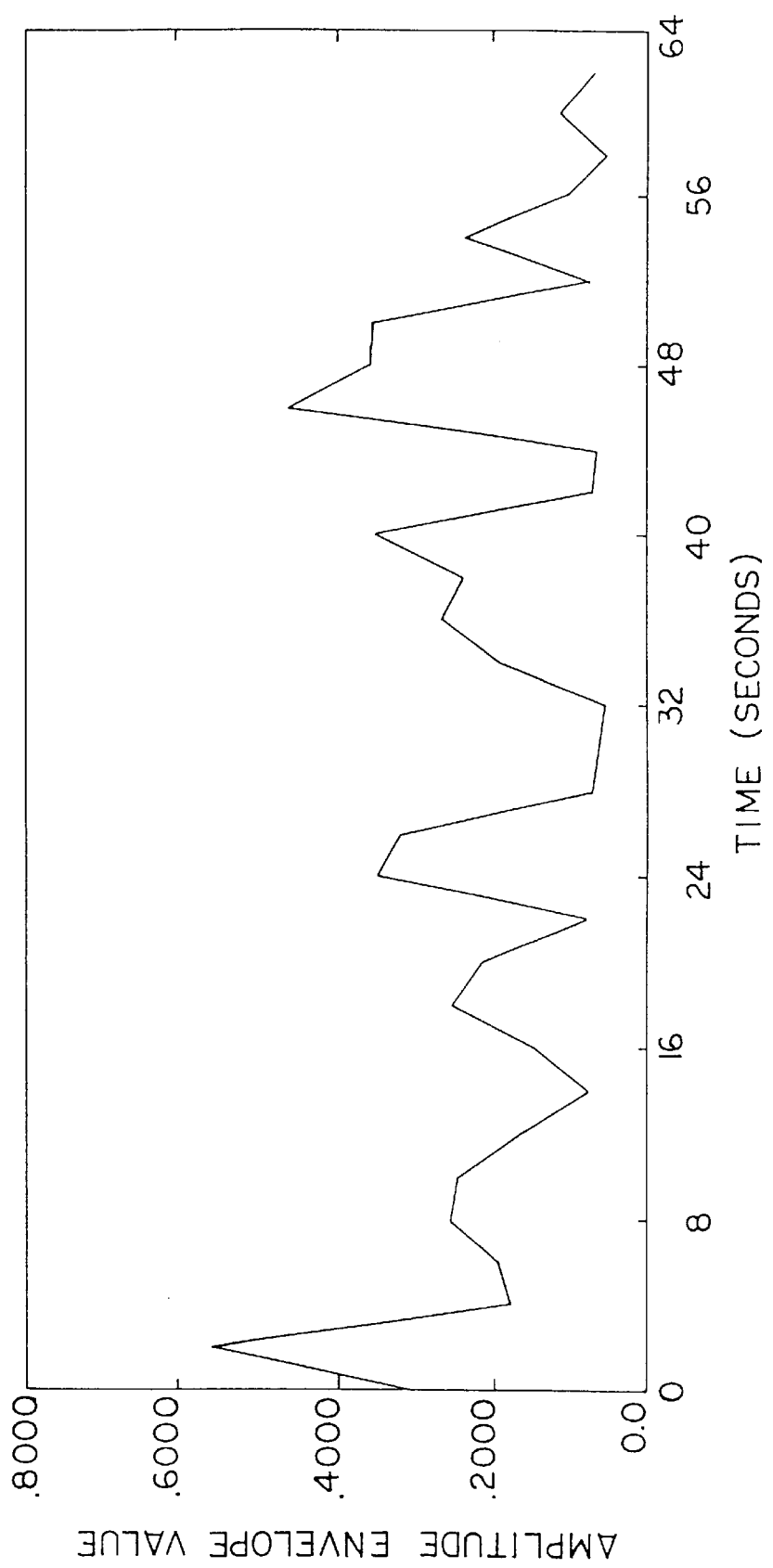

The maximum amplitude envelope value for each one-half (0.5) second interval is plotted in FIG. 11C for the subject and 11D for the control.

Figure 11E:
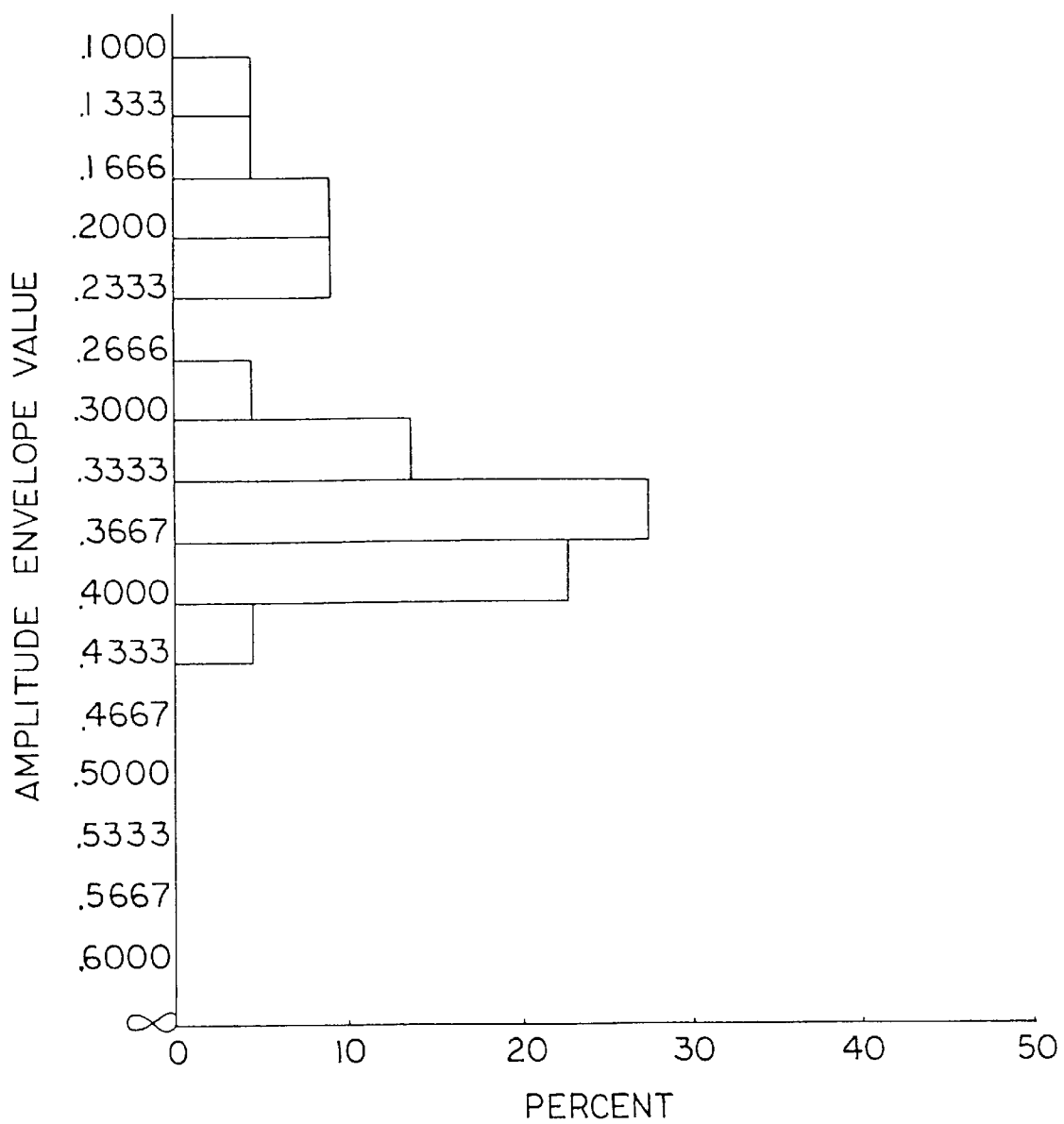
FIG. 11E presents a histogram of the maximum amplitude values for the analysis subject, which shows a pronounced peak.
Figure 12A:
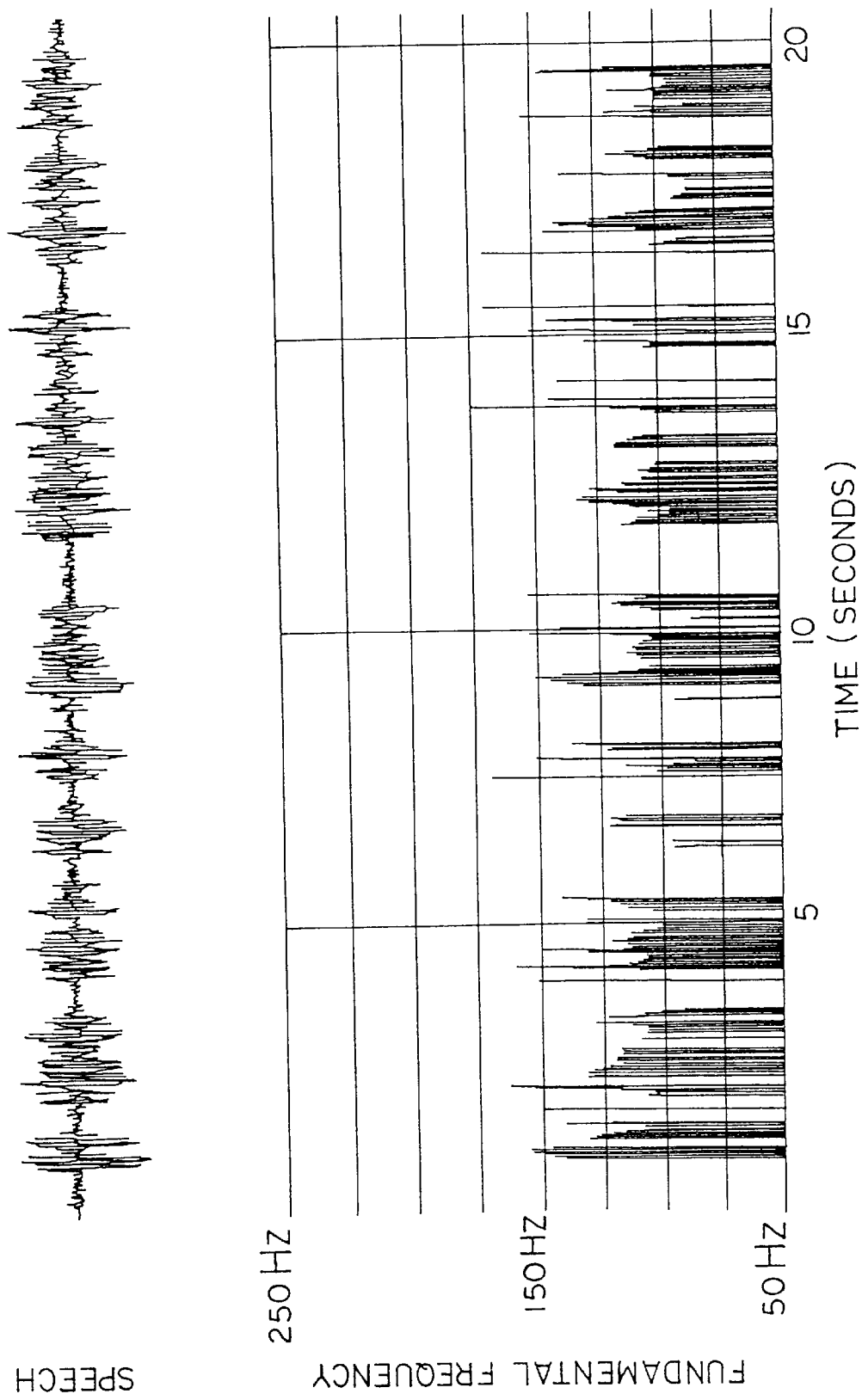
Figure 13B:
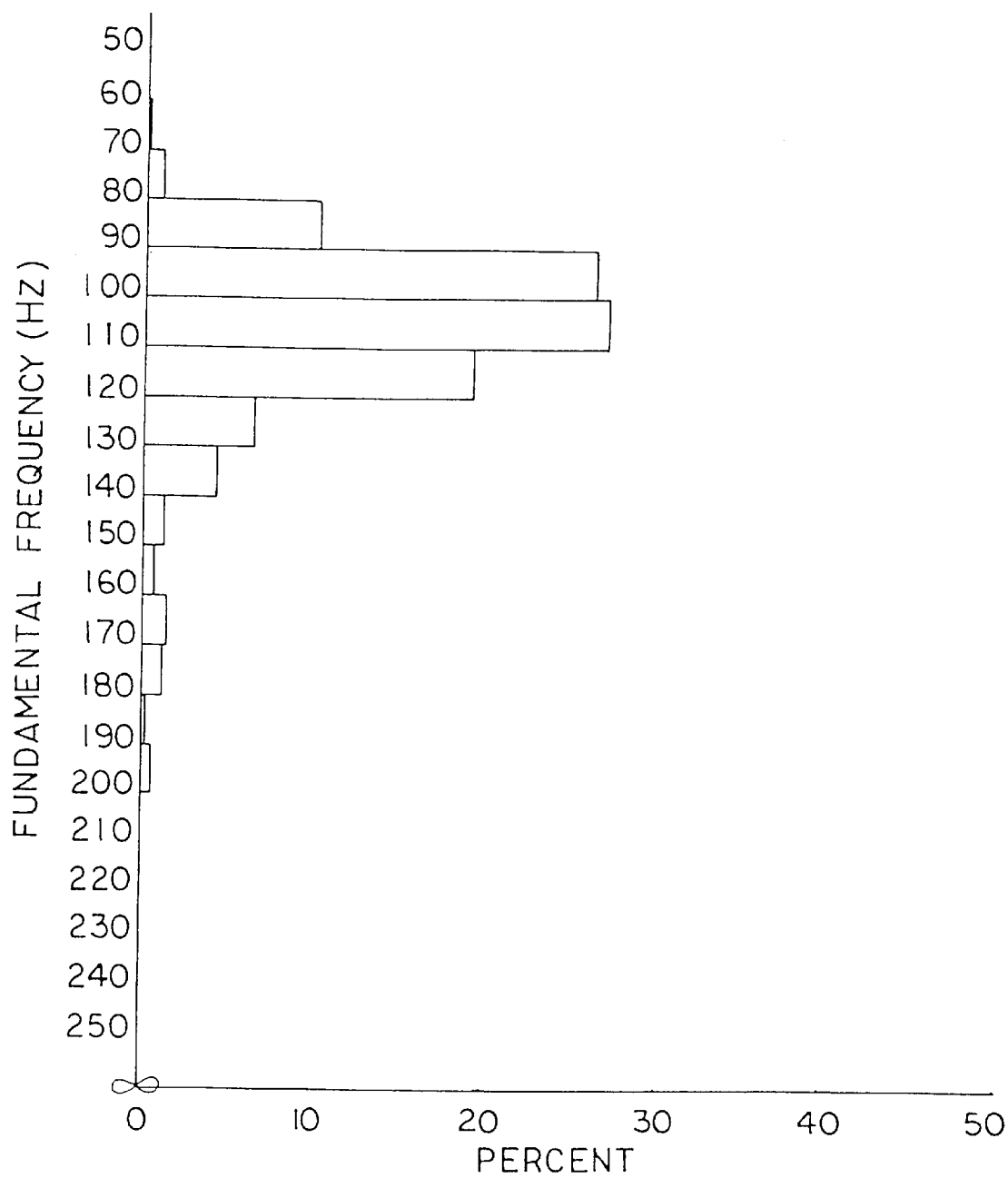
Figure 14A:
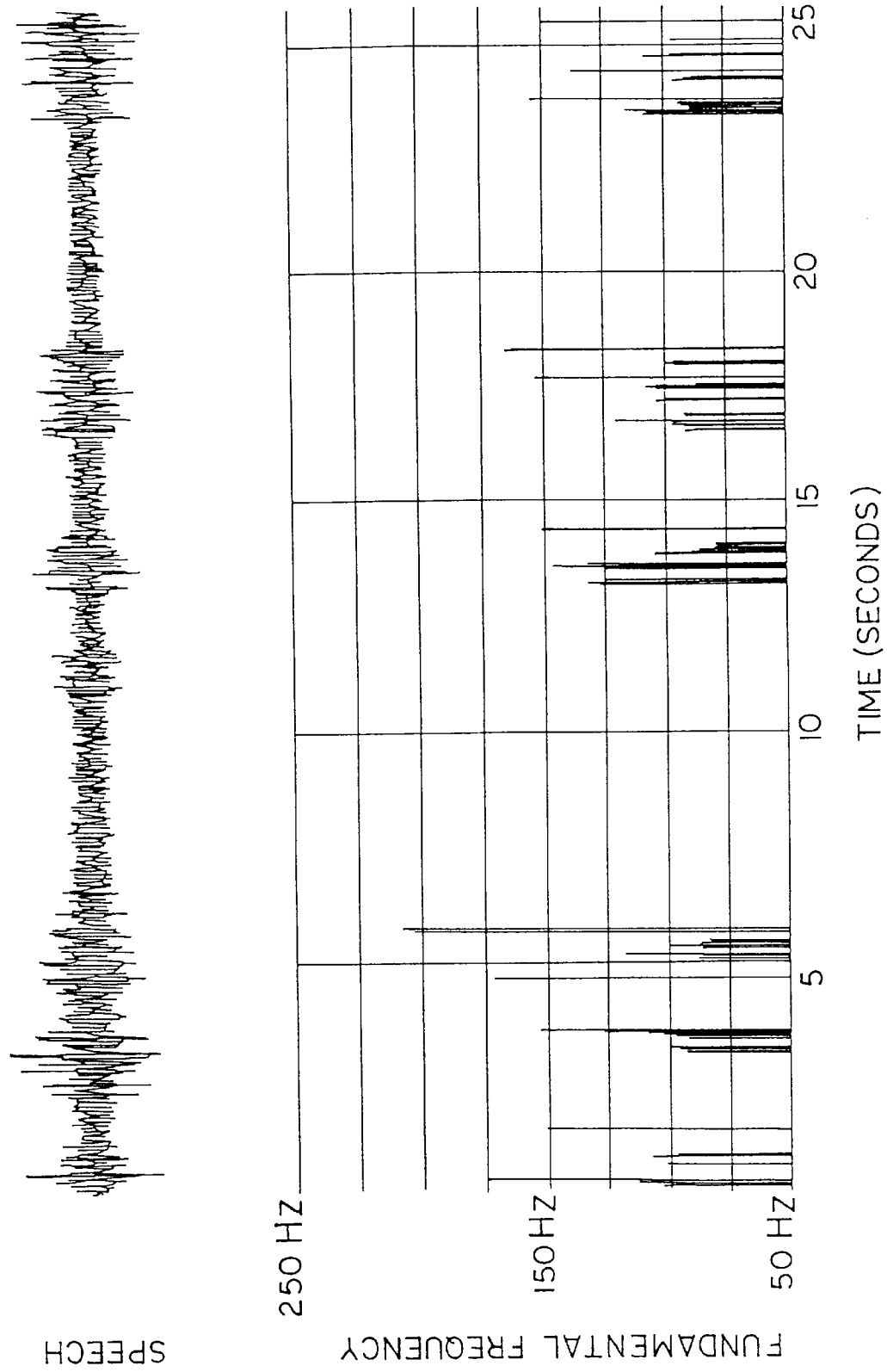
Figure 15A:
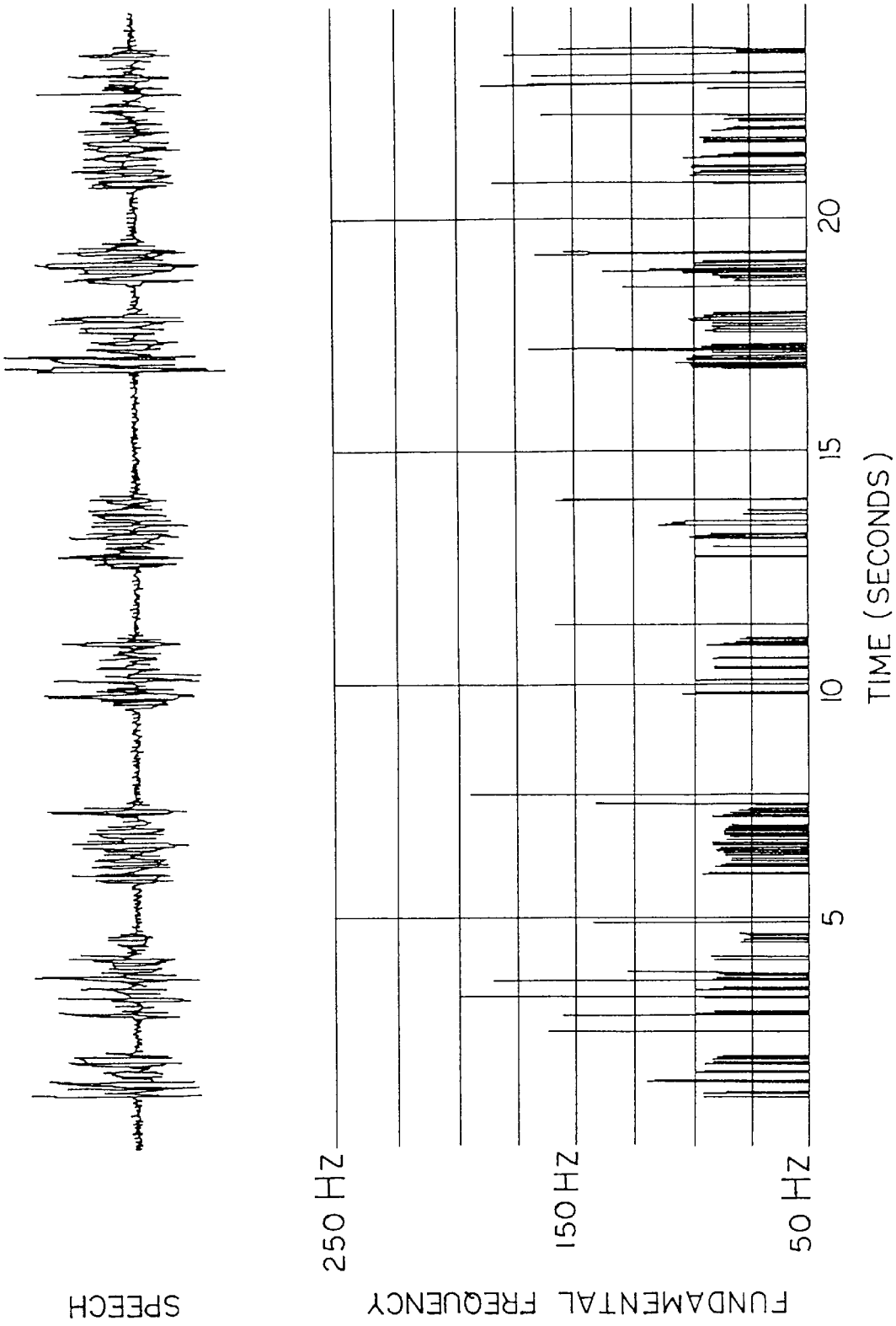
Figure 16A:
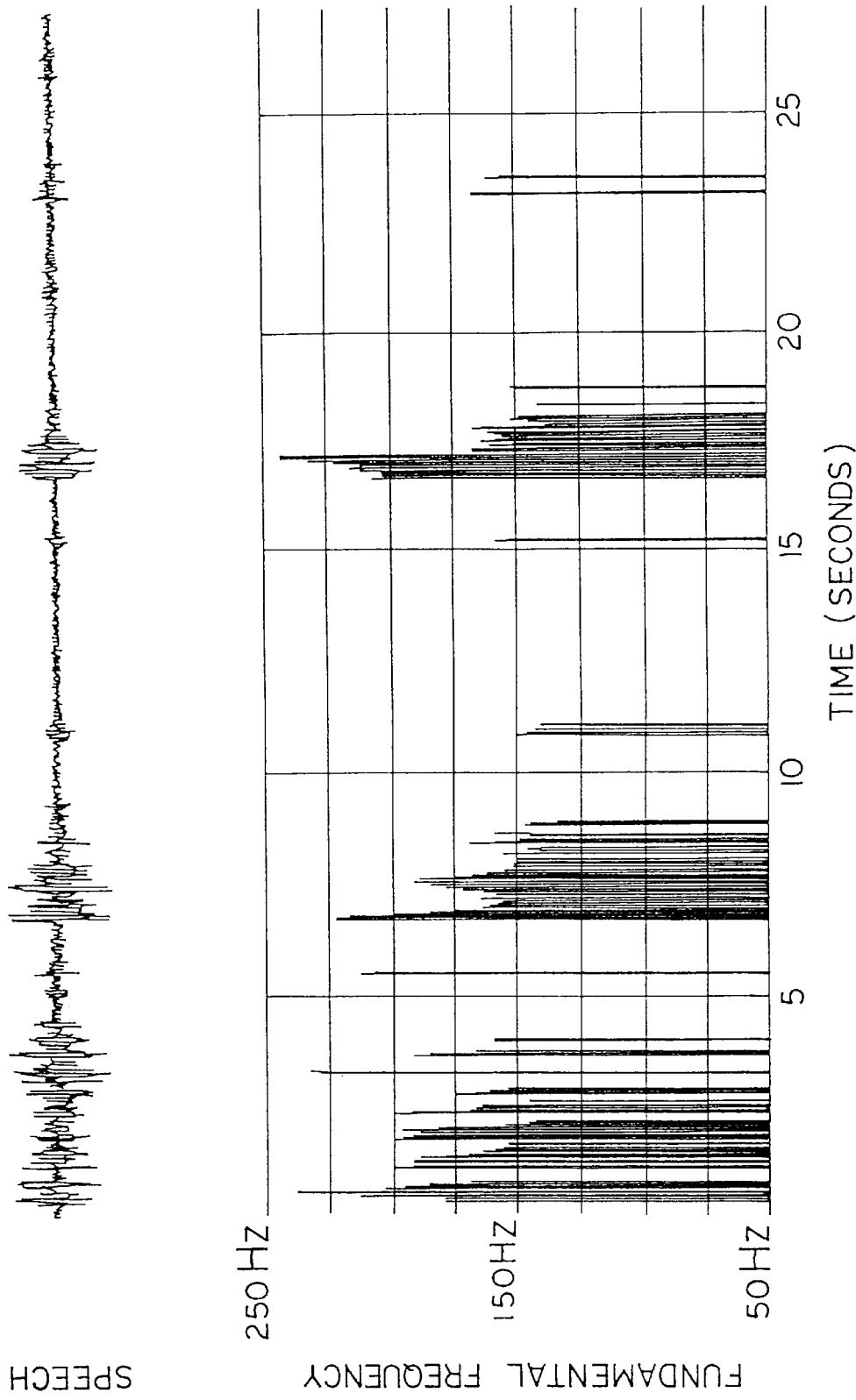
Figure 17B:
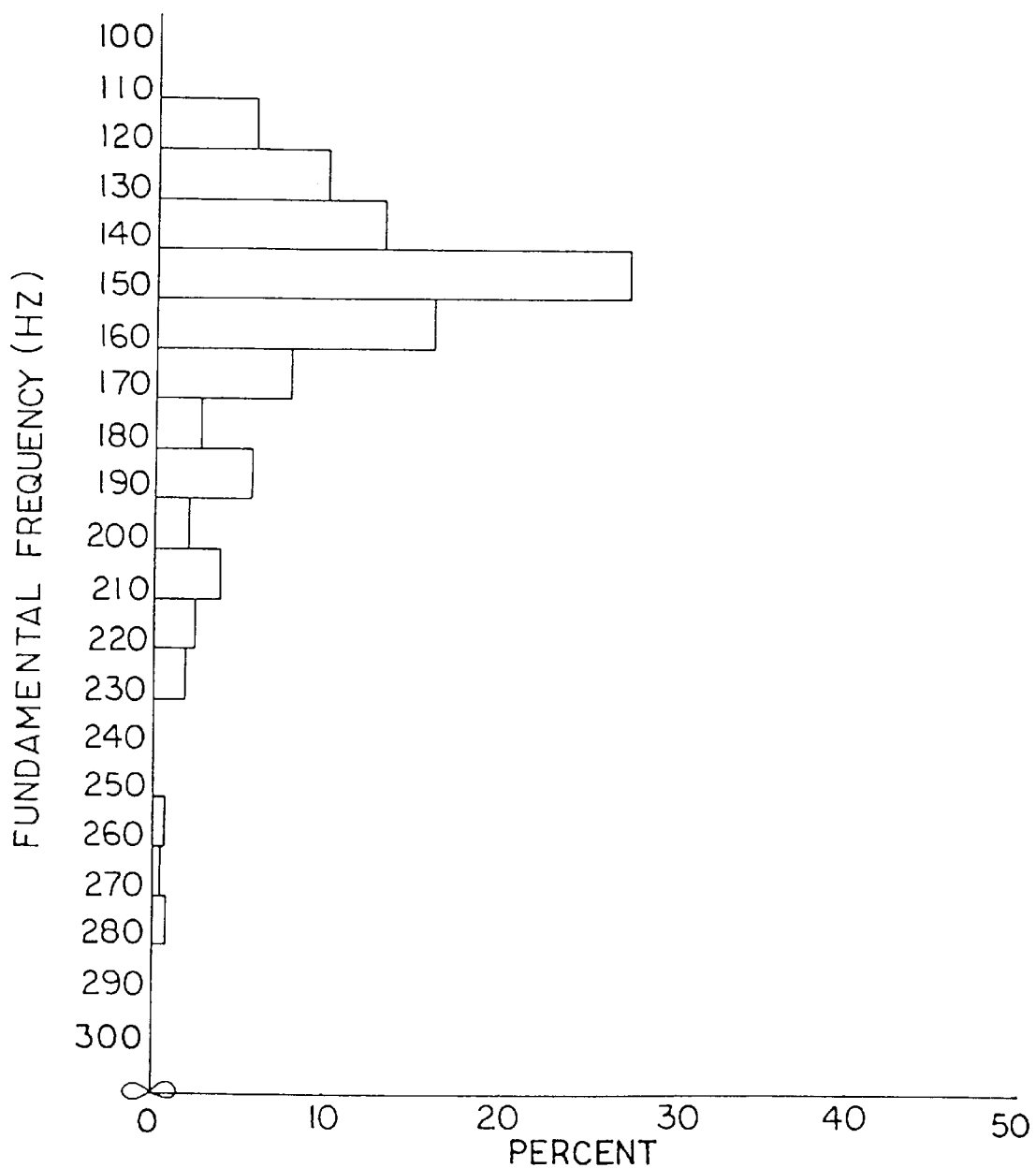
Figure 18B:
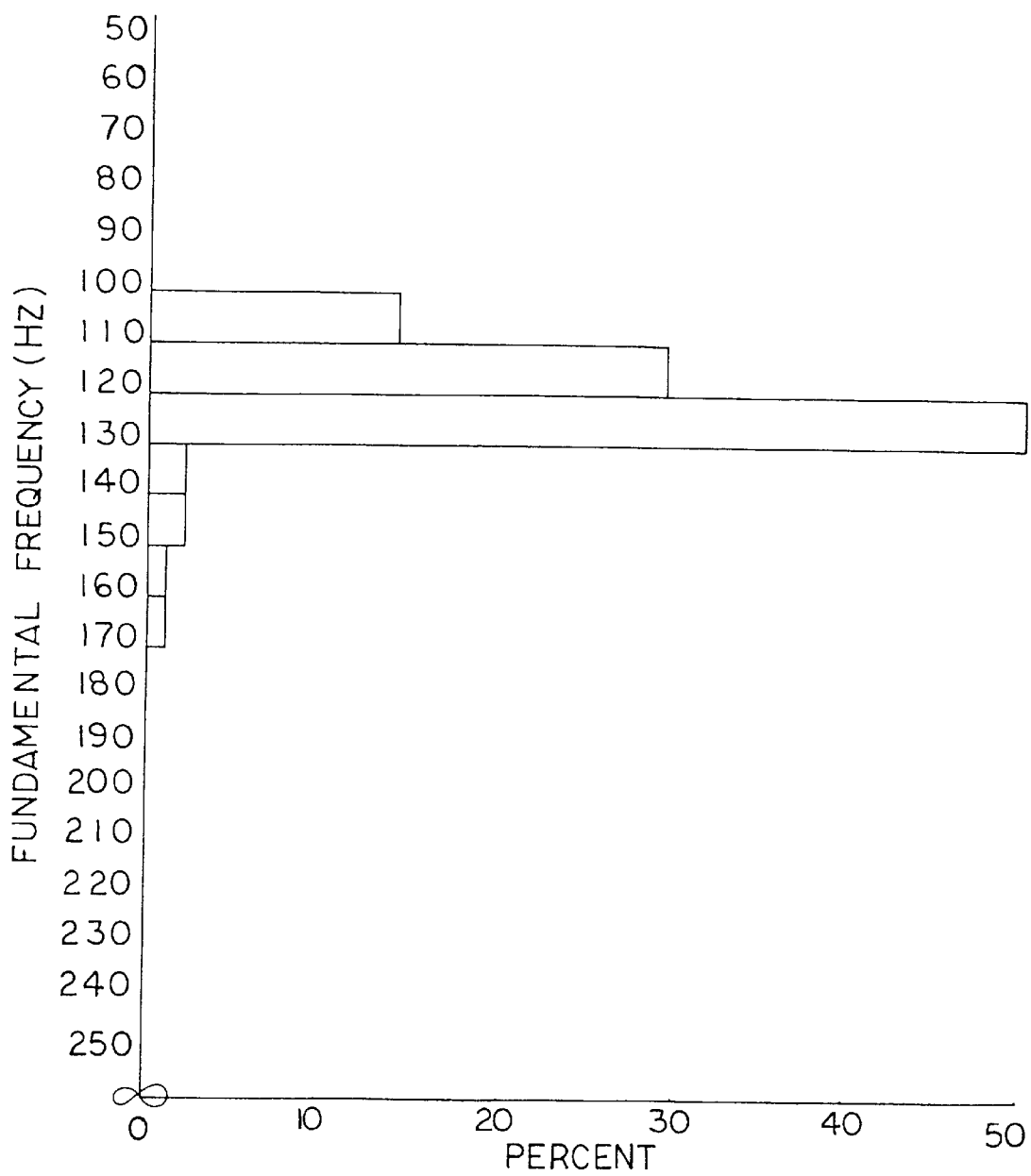
Figure 19A:
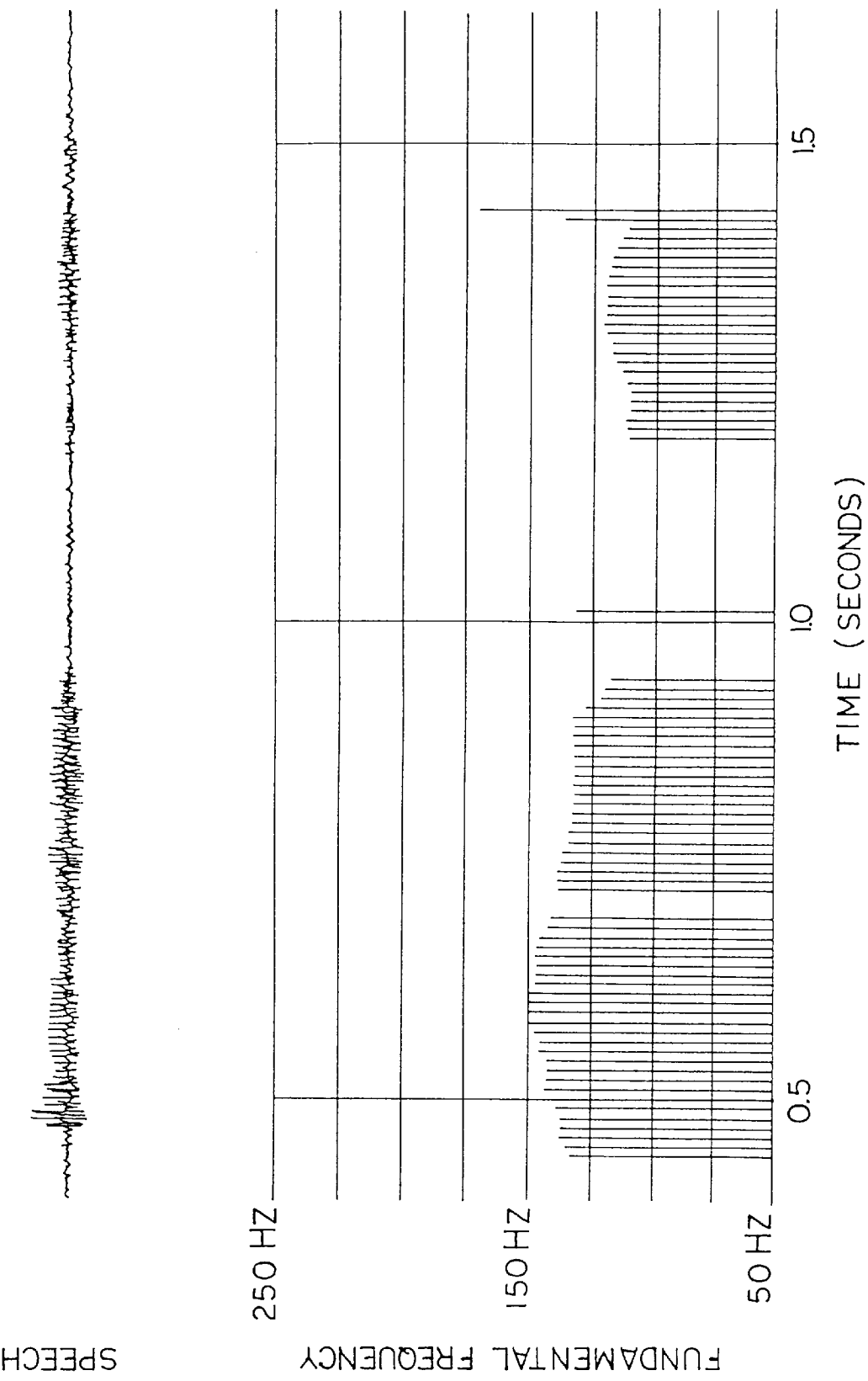
Figure 19B:
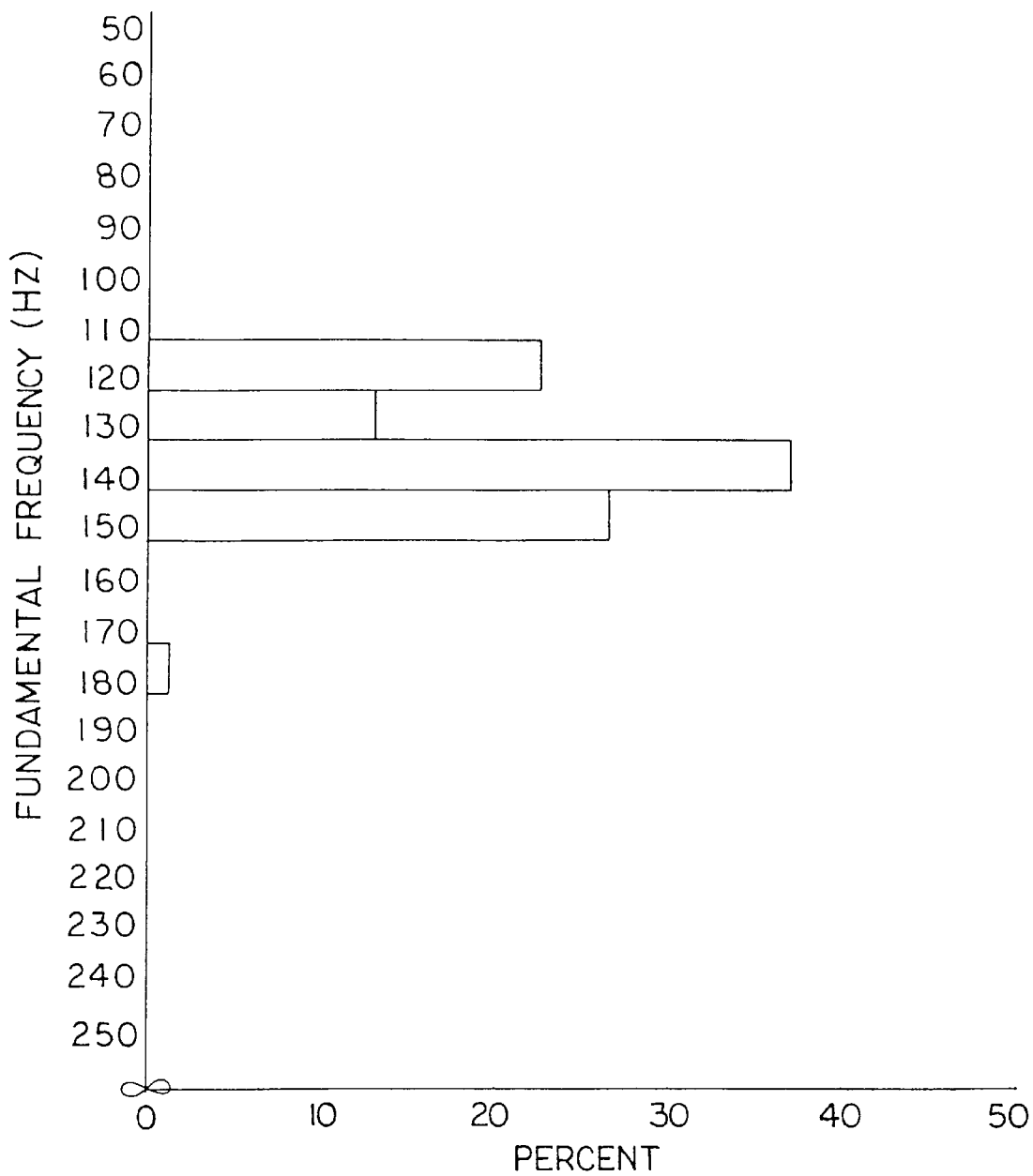

In FIG. 11E, a histogram of the maximum amplitude values for the analysis subject shows a pronounced peak. In other words the amplitude showed minimal variation.

In FIG. 11F, a histogram for the control shows a broader distribution indicating substantially more amplitude variation.

EXAMPLE 11

A vocal signal including several utterances was secured from a depressed person. The vocal signal was converted into an electrical analog signal and was subsequently converted to digital format. The resulting signal, representative of the vocal signal, was graphically displayed and recorded on a digital computer.

Audio was digitized by a MicroTechnology Unlimited MicroSound-AT operating at a sample rate of 10 Khz with 16 bit resolution. In the MicroSound-AT, analog (source) audio is anti-alias filtered in a two-step process. Audio was initially low pass filtered by a 4-pole Bessel filter providing phase linear response with a cutoff frequency (−3 db down point) at 25 Khz. The audio was then passed to a 16-bit analog to digital converter operating at 64 times oversampling.

Primary signal filtering was done by a hardware digital Finite Impulse Response (FIR) phase-linear filter. The digital FIR filter had a −3 db down point at 4,800 Hz, dropping sharply above that. Digital FIR filters have a very low passband ripple (variation in frequency response within the passband) up to 45% of the sample rate. These circuits operated synchronously with the analog to digital converter and also performed the required "downsampling" operation to bring the actual sample rate to 10,000 Hz.

Anti-alias filtering was necessary to ensure the integrity of the digitized data. The presence of signal components (including noise) at or above one half of the sampling frequency can result in "alias" or error signals in the digitized sample.

To observe decreased variation of fundamental frequency, audio samples were anti-alias filtered and digitized at a 10,000 Hz. sample rate. Next, the Analysis with Pitch Extraction (API) function of Signal Technology Incorporated's Interactive Laboratory System software was used to extract the fundamental frequency. The API function analyzes and models the spectral characteristics of the input data by way of autoregressive modeling (a linear prediction autocorrelation method) and cepstral processing.

First a decision is made as to whether a periodic (voiced) or non-periodic signal is present. The determination is based on a statistical excitation discrimination involving four basic features: The unnormalized residual rms energy, the zero crossing rate computed from the DC-cancelled input data, the cepstral peak value and the first reflection coefficient. These features are combined with adaptive weighting factors.

If the signal is periodic, its fundamental frequency is determined based upon a modified cepstral processing technique. A 32 Msec excitation buffer is utilized. A significant advantage of cepstral processing is its relative insensitivity to uneven spectral content; it can often provide acceptable estimation of fundamental frequency even if that frequency has been considerably diminished in amplitude by transmission or recording equipment.

The fundamental frequency estimates were calculated at 0.01 second intervals. The attached figures show a plot of the fundamental frequency estimations of each sample, with a time synchronized waveform plot above it.

Each sample was compared with a similarly processed control recording of the same utterance. Descriptive statistics were then calculated, and a histogram was plotted to show the variation of the fundamental frequency. (In these calculations, values outside the range of 50 to 300 Hz. are ignored. This eliminates the zeros that are used to flag those periods where the processing algorithm determined the sample to be "non-periodic" or noisy.)

Data is presented for four subjects and four controls in FIGS. 12A–19B. Table 1 presents presents descriptive statistics on the distribution of calculated fundamental frequency and the calculated coefficient of variation for all subjects and controls.

For each subject and control, FIGS. 12A–19A show shows the fundamental frequency (in Hz.) plotted vs. time, along with a synchronized audio waveform display.

For each subject and control, FIGS. 12B–19B show shows a histogram of the percentage (of the voiced intervals only) of occurrence at various fundamental frequencies.

The calculated coefficient of variation of the fundamental frequency was lower (fundamental frequency varied less) for the subjects than for the controls in all four cases. A t-test, as shown in Table 1, comparing the means of the coefficients of variation for the subjects and the means of the controls as matched pairs, indicates that the difference is significant.

As the examples show, if the vocal signal secured from the speaker exhibits substantial instantaneous amplitude decay upon conclusion of an utterance or a series of utterances, or if the amplitude modulation is low during an utterance or a series of utterances, or if the speaker exhibits decreased variation of fundamental frequency, or if the speaker exhibits low frequency of amplitude modulation this is indicative of suicidal predisposition. Conversely, if amplitude decays substantially instantaneously upon conclusion of an utterance or a series of utterances of if amplitude modulation is large during an utterance or a series of utterances, or if the speaker exhibits increased variation of fundamental frequency, or if the speaker exhibits high frequency of amplitude modulation, the speaker, while depressed, is not indicated to be suicidally predisposed. These four indicators, namely amplitude decay, amplitude modulation, variation of fundamental frequency, and frequency of amplitude modulation, are believed to be independent but simultaneously occurring indications of suicidal predisposition or lack thereof. No vocal signal has been examined having amplitude decay indicative of suicidal predisposition while having amplitude modulation or variation of fundamental frequency or frequency of amplitude modulation indicative of lack of suicidal predisposition, or vice versa.

To determine whether a person's vocal signal amplitude modulation is low, amplitude modulation during an utterance may be compared to that of a person known to be in good mental health, not susceptible to depression and not suicidally predisposed. The utterance amplitude modulation of the person known to be in good mental health may serve as a standard or benchmark. Such a person's amplitude modulation characteristic during an utterance would be similar to those exhibited in FIGS. 6, 7, 8 and 9.

Where a graphic display of a mentally healthy person's amplitude modulation during an utterance is available, it is quite straightforward to compare the utterance amplitude modulation of a person of interest to the benchmark amplitude modulation of the known healthy person. In such case, the presence or absence of low amplitude modulation in the utterance of the person of interest is quickly apparent. The difference between low amplitude modulation in the utterance of the person of interest and benchmark amplitude modulation would be similar to the difference seen upon comparing FIGS. 5 and 9.

Similarly, presence or absence of substantially instantaneous amplitude decay upon conclusion of an utterance may easily be determined by comparing the vocal signal of a person of interest to that of a person known to be in good mental health, not susceptible to depression and not suicidally predisposed. The substantially instantaneous utterance amplitude decay of the person known to be in good mental health may also serve as another standard or benchmark. Such a person's amplitude decay at the end of an utterance would be similar to those exhibited in FIGS. 6, 7, 8 and 9.

Where a graphic display of a mentally healthy person's amplitude decay at the end of an utterance is available, it is quite straightforward to compare the amplitude decay at the end of an utterance of a person of interest to the benchmark amplitude decay of the known healthy person. In such case, the presence or absence of substantially instantaneous amplitude decay upon conclusion of the utterance of the person of interest is quickly apparent. The difference between substantially non-instantaneous amplitude decay upon conclusion of the utterance of the person of interest and benchmark amplitude decay would be similar to the differences seen upon comparing FIGS. 2 and 6.

Similarly, increased or decreased variation of fundamental frequency during an utterance may be determined by comparing the vocal signal of a person of interest to that of a person known to be in good mental health, not susceptible to depression and not suicidally predisposed. This indicator may be used in conjunction with amplitude decay and amplitude modulation to serve as another standard or benchmark.

Similarly, high or low frequency of amplitude modulation during an utterance may be determined by comparing the vocal signal of a person of interest to that of a person known to be in good mental health, not susceptible to depression and not suicidally predisposed. This indicator may be used in conjunction with amplitude decay, amplitude modulation, and variation of fundamental frequency to serve as another standard or benchmark.

Of course, if the speaker is suicidally predisposed, the invention encompasses the step of taking preventive action with respect to the speaker in order to prevent suicide. This may include administration of drugs, physically restraining the speaker, merely continuing observation of the speaker, a combination of these steps or other steps deemed appropriate in the mind of the attending physician or other health care professional.

While the preferred embodiment of the invention has been described above and alternative embodiments have also been described, the scope of protection to which the invention is believed entitled is defined by the claims and by equivalents thereto which perform substantially the same function in substantially the same way to achieve substantially the same result as the subject matter defined literally by the claims, so long as such substantial equivalents, as defined by a claim for such substantial equivalent, do not read on the prior art.

I claim the following:

1. A method for electronically detecting suicidal predisposition in a person using a series of closely spaced vocal utterances from such person independently of linguistic content comprising the steps of:
   a. electronically filtering background noise from said utterance to obtain a signal representative of said utterance;
   b. electronically filtering amplitude components of said signal above and below a preselected range of signal amplitudes to obtain a signal whose amplitude varies with time within a preselected range, independent of signal frequency;
   c. identifying the person as being suicidally predisposed if signal amplitude exhibits substantially non-instantaneous decays upon conclusion of each utterance relative to the decays of utterance signals from persons known to be in good mental health; and
   d. identifying the person as being suicidally predisposed if utterance signal amplitude modulation is low relative to signal amplitude modulation of signals from persons known to be in good mental health; and
   e. identifying the person as being suicidally predisposed if utterance variation of fundamental frequency is low relative to variation of fundamental frequency of signals from persons known to be in good mental health; and
   f. identifying the person as being suicidally predisposed if utterance frequency of signal amplitude modulation is low relative to signal amplitude modulation of signals from persons known to be in good mental health.

2. A method for electronically detecting human suicidal predisposition by analysis of an elicited series of vocal utterances from an emotionally disturbed or distraught person, independently of linguistic content of the elicited vocal utterance, comprising the steps of:
   a. converting the utterance into an electrical signal having time varying amplitude and frequency which are representative thereof;
   b. filtering frequency components of said signal above and below preselected frequencies to obtain a signal within said preselected frequencies;
   c. filtering non-repetitive components, having amplitude above about 90% of average amplitude of the signal, out of the signal;
   d. filtering repetitive signal components having frequency outside about 90% frequency bandwidth of the signal, out of the signal;
   e. identifying as suicidally predisposed a person from whom said vocal utterance emanated if signal amplitude exhibits substantially non-instantaneous decays upon conclusion of each utterance or signal amplitude modulation is low or variation of fundamental frequency is low or frequency of amplitude modulation is low, relative to the decays of utterance signals or signal amplitude modulation or variation of fundamental frequency or frequency of amplitude modulation of persons known to be in good mental health.

3. The method of claim 2 wherein said preselected frequencies are 200 and 10,000 Hz.

4. The method of claim 3 wherein said step of identifying as suicidally predisposed the person from whom said vocal utterance emanated if signal amplitude exhibits a substantially non-instantaneous decay upon conclusion of the utterance or signal amplitude modulation is low is preformed with signal amplitude decay in excess of 1 second being considered substantially non-instantaneous.

5. The method of claim 4 wherein signal amplitude decay in excess of 2 seconds is considered substantially non-instantaneous.

6. The method of claim 4 wherein signal amplitude decay in excess of 3 seconds is considered substantially non-instantaneous.

7. A method for detecting human suicidal predisposition by analysis of a series of closely space vocal utterances from a person thought to be emotionally disturbed, independently of linguistic content of the elicited utterances, comprising the steps of:
 a. converting the utterances into an electrical signal having time varying amplitude and frequency which are representative thereof;
 b. filtering frequency components of said signal above and below preselected frequencies to obtain a signal within said preselected frequencies;
 c. filtering non-repetitive components, having amplitude above about 90% of average amplitude of the signal, out of the signal;
 d. filtering repetitive signal components, having frequency outside about 90% frequency bandwidth of the signal, out of the signal;
 e. identifying as suicidally predisposed a person from whom said vocal utterances emanated if signal amplitude modulation is low relative to comparison signal amplitude modulation of persons known to be in good mental health;
 f. identifying the person as suicidally predisposed if the thrice filtered signal amplitude modulation is low by electronically preparing a video display of said thrice filtered signal and examining the display visually to determine whether frequency of signal amplitude modulation is low;
 g. medicating the person detected as being suicidally predisposed; and
 h. restraining the person detected as being suicidally predisposed.

8. The method of claim 7 wherein said electrical signal is an analog signal.

9. The method of claim 7 wherein said electrical signal is a digital signal.

10. A method for electronically detecting human suicidal predisposition by analysis of an elicited series of vocal utterances from an emotionally disturbed or distraught person, independently of linguistic content of the elicited vocal utterance, comprising the steps of:
 a. converting the utterance into an electrical signal having time varying amplitude and frequency which are representative thereof;
 b. filtering frequency components of said signal above and below preselected frequencies to obtain a signal within said preselected frequencies;
 c. filtering non-repetitive components, having amplitude above about 90% of average amplitude of the signal, out of the signal;
 d. filtering repetitive signal components having frequency outside about 90% frequency bandwidth of the signal, out of the signal;
 e. identifying as suicidally predisposed a person from whom said vocal utterance emanated if variation of fundamental frequency is low relative to variation of fundamental frequency of persons known to be in good health.

11. A method for electronically detecting human suicidal predisposition by analysis of a series of closely spaced utterances from an emotionally disturbed person actively seeking professional help independently of linguistic content, comprising the steps of:
 a. converting the utterances into an analog electric signal having time varying amplitude and frequency which are representative thereof;
 b. anti-alias filtering and digitizing by low-pass filtering at about 25 Khz the signal using a 4-pole Bessel filter providing phase linear response with a cutoff frequency which is about the −3 db down point using a preselected sampling frequency of about 10 Khz at a value twice that of the highest frequency not to be filtered out to obtain a signal within prescribed frequencies;
 c. extracting the fundamental frequency of said signal by analyzing and modeling the spectral characteristics of the input data by autoregression comprising:
  i. determining whether in the signal a periodic or non-periodic signal is present basing the decision on a statistical excitation discrimination involving unnormalized residual rms energy, zero crossing rate computed from the DC-cancelled input data, cepstral peak value and first reflection coefficient;
  ii. combining these features using adaptive weighting factors;
  iii. if a periodic signal is present, determining its fundamental frequency based upon a modified cepstral processing technique utilizing a 32 msec excitation buffer;
 d. plotting the fundamental frequency values for 0.01 second intervals in a histogram as fundamental frequency versus percent occurrence to show variation of the fundamental frequency, ignoring values outside of the normal range of from about 50 to about 200 Hz; and
 e. identifying as suicidally predisposed a person from whom said vocal utterances emanated if the variation of fundamental frequency is minimal relative to the broader distribution of a comparison signal from persons known not to be suicidally predisposed.

12. A method for electronically detecting human suicidal predisposition by analysis of a series of closely spaced utterances from an emotionally disturbed person actively seeking professional help independently of linguistic content, comprising the steps of:
 a. converting the utterances into an analog electric signal having time varying amplitude and frequency which are representative thereof;
 b. anti-alias filtering and digitizing by low-pass filtering at about 25 Khz the signal using a 4-pole Bessel filter providing phase linear response with a cutoff frequency which is about the −3 db down point using a preselected sampling frequency of about 10 Khz at a value twice that of the highest frequency not to be filtered out to obtain a signal within prescribed frequencies;
 c. extracting the fundamental frequency of said signal by analyzing and modeling the spectral characteristics of the input data by autoregression comprising:
  i. determining whether in the signal a periodic or non-periodic signal is present basing the decision on a statistical excitation discrimination involving unnormalized residual rms energy, zero crossing rate computed from the DC-cancelled input data, cepstral peak value and first reflection coefficient;
  ii. combining these features using adaptive weighting factors;

iii. if a periodic signal is present, determining its fundamental frequency based upon a modified cepstral processing technique utilizing a 32 msec excitation buffer;

d. calculating coefficient of variation of the fundamental frequency, ignoring values outside the normal range of from about 50 to about 200 Hz;

e. using a T-test identifying as suicidally predisposed a person from whom said vocal utterances emanated if the calculated coefficient of variation of the fundamental frequency is significantly lower relative to the broader distribution of a comparison signal from persons known not to be suicidally predisposed.

* * * * *